(12) United States Patent
Posch

(10) Patent No.: US 12,443,200 B2
(45) Date of Patent: Oct. 14, 2025

(54) THERMAL IMAGING FOR NAVIGATION SYSTEMS AND METHODS

(71) Applicant: Teledyne FLIR Commercial Systems, Inc., Goleta, CA (US)

(72) Inventor: Chris J. Posch, Santa Barbara, CA (US)

(73) Assignee: Teledyne FLIR Commercial Systems, Inc., Goleta, CA (US)

( * ) Notice: Subject to any disclaimer, the term of this patent is extended or adjusted under 35 U.S.C. 154(b) by 418 days.

(21) Appl. No.: 17/685,349

(22) Filed: Mar. 2, 2022

(65) Prior Publication Data

US 2022/0291701 A1    Sep. 15, 2022

Related U.S. Application Data

(60) Provisional application No. 63/167,632, filed on Mar. 29, 2021, provisional application No. 63/159,444, filed on Mar. 10, 2021.

(51) Int. Cl.
G05D 1/00       (2024.01)
G01S 13/86      (2006.01)
(Continued)

(52) U.S. Cl.
CPC ............ *G05D 1/106* (2019.05); *G01S 13/865* (2013.01); *G01S 13/867* (2013.01); *G01S 13/933* (2020.01);
(Continued)

(58) Field of Classification Search
CPC ..... G05D 1/106; B64C 39/024; G01S 13/865; G01S 13/867; G01S 13/933; G01S 13/86; G01S 13/931; G01S 17/931; G01S 19/45; G01S 19/47; G06V 20/17; G06V 20/194; G06V 20/13; G06V 20/58; B64U 2101/30;
(Continued)

(56) References Cited

U.S. PATENT DOCUMENTS 5,706,355 A    1/1998   Raboisson et al.
2010/0309315 A1  12/2010 Hogasten et al.
(Continued)

FOREIGN PATENT DOCUMENTS

CN      112335190 A    2/2021
WO   WO 2019/225349 A1   11/2019
(Continued)

*Primary Examiner* — Luke Huynh
(74) *Attorney, Agent, or Firm* — Haynes and Boone, LLP

(57) ABSTRACT

Thermal imaging and navigation systems and related techniques are provided to improve the operation of manned or unmanned mobile platforms, including passenger vehicles. A thermal imaging navigation system includes a thermal imaging system and a logic device configured to communicate with the thermal imaging system. The thermal imaging system includes a thermal imaging module configured to provide thermal image data corresponding to a projected course for a mobile platform. The logic device is configured to receive the thermal image data, receive orientation and/or position data corresponding to the thermal image data, and generate maneuvering obstacle information corresponding to the projected course based, at least in part, on the orientation and/or position data and/or the thermal image data.

16 Claims, 22 Drawing Sheets

(51) Int. Cl.
*G01S 13/933* (2020.01)
*G06V 20/10* (2022.01)
*G06V 20/17* (2022.01)
*B64U 10/14* (2023.01)
*B64U 30/20* (2023.01)
*B64U 101/30* (2023.01)

(52) U.S. Cl.
CPC ............ *G06V 20/17* (2022.01); *G06V 20/194* (2022.01); *B64U 10/14* (2023.01); *B64U 30/20* (2023.01); *B64U 2101/30* (2023.01)

(58) Field of Classification Search
CPC ........ B64U 10/14; B64U 30/20; G01C 21/20; G01C 21/165; G01C 21/1652; G01C 21/18; G01C 21/28; G01C 21/3848; G01C 21/3885; G08G 1/165; G08G 1/166; G08G 5/0021; G08G 5/0069; G08G 5/0078; G08G 5/0086; G08G 5/0091; G08G 5/045; G08G 5/0013
See application file for complete search history.

(56) References Cited

U.S. PATENT DOCUMENTS

| | | | |
|---|---|---|---|
| 2012/0020523 A1* | 1/2012 | Ikeda | G01B 11/002 382/103 |
| 2013/0235163 A1 | 9/2013 | Joo | |
| 2017/0203744 A1* | 7/2017 | Dagan | G06V 20/58 |
| 2018/0292529 A1* | 10/2018 | Hogasten | G01S 17/931 |
| 2020/0057488 A1* | 2/2020 | Johnson | G06T 19/20 |
| 2020/0098394 A1 | 3/2020 | Levinson et al. | |
| 2021/0232842 A1 | 7/2021 | Yamamoto | |

FOREIGN PATENT DOCUMENTS

| | | | | |
|---|---|---|---|---|
| WO | WO 2019244060 A1 | 12/2019 | | |
| WO | WO 2020247212 A1 | 12/2020 | | |
| WO | WO_2021041841 | * | 3/2021 | ........... G06V 20/194 |
| WO | WO-2021041841 A1 | * | 3/2021 | ........... B64C 39/024 |

* cited by examiner

THERMAL IMAGING FOR NAVIGATION SYSTEMS AND METHODS

CROSS-REFERENCE TO RELATED APPLICATIONS

This application claims priority to and the benefit of U.S. Provisional Patent Application No. 63/159,444 filed on Mar. 10, 2021 and entitled "THERMAL IMAGING FOR NAVIGATION SYSTEMS AND METHODS" and U.S. Provisional Patent Application No. 63/167,632 filed Mar. 29, 2021 and entitled "THERMAL IMAGING FOR NAVIGATION SYSTEMS AND METHODS," which are hereby incorporated by reference in their entirety.

This application is related to International Patent Application No. PCT/US2021/012554 filed Jan. 7, 2021 and entitled "VEHICULAR RADIOMETRIC CALIBRATION SYSTEMS AND METHODS," which claims priority to and the benefit of U.S. Provisional Patent Application No. 62/959,602 filed on Jan. 10, 2020 and entitled "VEHICULAR RADIOMETRIC CALIBRATION SYSTEMS AND METHODS," which are hereby incorporated by reference in their entirety.

This application is related to International Patent Application No. PCT/US2020/048450 filed Aug. 28, 2020 and entitled "MULTISPECTRAL IMAGING FOR NAVIGATION SYSTEMS AND METHODS," which claims priority to and the benefit of U.S. Provisional Patent Application No. 62/894,544 filed on Aug. 30, 2019 and entitled "MULTISPECTRAL IMAGING FOR NAVIGATION SYSTEMS AND METHODS," which are hereby incorporated by reference in their entirety.

TECHNICAL FIELD

The present invention relates generally to multispectral imaging and, more particularly, to systems and methods for multispectral imaging for use in navigation of mobile platforms.

BACKGROUND

Modern mobile platforms, such as assisted or autopiloted manned and unmanned terrestrial vehicles and aircraft, including unmanned aerial vehicles (UAVs), remotely operated underwater vehicles (ROVs), unmanned (water) surface vehicles (USVs), and unmanned ground vehicles (UGVs), any of which may be configured as unmanned sensor platforms, are able to operate over long distances and in all environments; rural, urban, and even underwater. Operation of such systems may include real-time feedback to a pilot and/or wireless transmissions between an unmanned platform and a remote base station, which often includes a display to efficiently convey telemetry, imagery, and other sensor data captured by the platform to an operator. An operator can often monitor auto or assisted navigation of, and if necessary pilot or otherwise control, a manned or unmanned mobile platform throughout an entire mission relying solely on imagery feedback or data received from the mobile platform.

Conventional imaging systems are often either too expensive and bulky or lack sufficient contrast under relatively common environmental conditions to be used for reliable and safe auto or assisted navigation of a vehicle or other mobile platform. Thus, there is a need for compact imaging systems and related techniques to provide reliable scene evaluation for use with navigation of mobile platforms.

SUMMARY

Multispectral navigation systems and related techniques are provided to improve the operation of manned or unmanned mobile platforms, including assisted-or-autopiloted manned vehicles and unmanned sensor or survey platforms. One or more embodiments of the described multispectral navigation systems may advantageously include a multispectral imaging system including a multispectral imaging module, a communication module configured to establish a wireless communication link with a base station associated with the mobile platform, an orientation and/or position sensor configured to measure orientations and/or positions of the multispectral imaging system and/or a coupled mobile platform, a controller to control operation of the communication module, the orientation and/or position sensor, and/or the mobile platform, and one or more additional sensors to measure and provide sensor data corresponding to maneuvering and/or other operation of the mobile platform.

In various embodiments, such additional sensors may include a remote sensor system configured to capture sensor data of a survey area from which a two and/or three-dimensional spatial map of the survey area may be generated. For example, the navigation system may include one or more visible spectrum, infrared, and/or ultraviolet cameras and/or other remote sensor systems coupled to a mobile platform. The mobile platform may generally be a flight platform (e.g., a manned aircraft, a UAS, and/or other flight platform), a terrestrial platform (e.g., a motor vehicle), or a water born platform (e.g., a watercraft or submarine). More generally, a multispectral imaging system for a multispectral navigation system may be implemented as a multispectral autonomous vehicle imaging system (e.g., a MAVIS, for use with various autonomous or autopiloted mobile platforms or vehicles).

In one embodiment, a system includes a multispectral imaging system including a multispectral imaging module configured to provide multispectral image data corresponding to a projected course for a mobile platform, and a logic device configured to communicate with the multispectral imaging system. The logic device may be configured to receive the multispectral image data corresponding to the projected course; receive orientation and/or position data corresponding to the multispectral image data; and generate maneuvering obstacle information corresponding to the projected course based, at least in part, on a combination of the orientation and/or position data and the multispectral image data.

In another embodiment, a method includes receiving multispectral image data from a multispectral imaging system including a multispectral imaging module configured to provide multispectral image data corresponding to a projected course for a mobile platform; receiving orientation and/or position data corresponding to the multispectral image data; and generating maneuvering obstacle information corresponding to the projected course based, at least in part, on a combination of the orientation and/or position data and the multispectral image data.

In one embodiment, a system includes a thermal imaging system including a thermal imaging module configured to provide thermal image data corresponding to a projected course for a mobile platform, and a logic device configured to communicate with the thermal imaging system. The logic device may be configured to receive the thermal image data corresponding to the projected course; and generate maneuvering obstacle information corresponding to the projected course based, at least in part, on the thermal image data.

In another embodiment, a method includes receiving thermal image data from a thermal imaging system including a thermal imaging module configured to provide thermal image data corresponding to a projected course for a mobile platform; and generating maneuvering obstacle information corresponding to the projected course based, at least in part, on the thermal image data.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
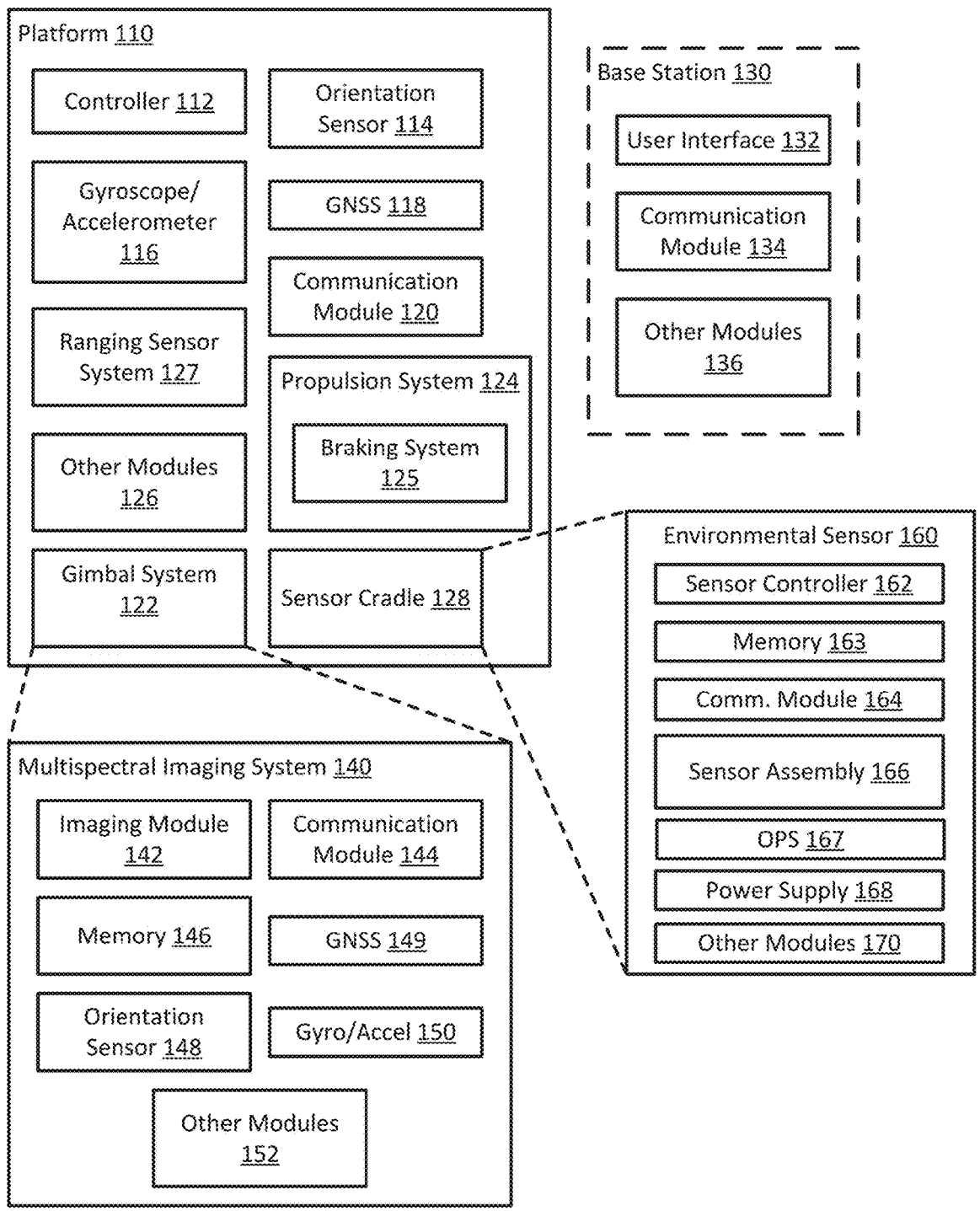
FIG. 1 illustrates a diagram of a multispectral navigation system in accordance with an embodiment of the disclosure.

Multispectral navigation systems and related techniques are provided to improve the operational flexibility and reliability of mobile platforms, including unmanned mobile sensor platforms. Imaging systems for use with an advanced driver assistance system (ADAS) typically acquire real-time video imagery of an immediate environment about a vehicle or mobile platform. Such imagery can help a pilot (e.g., a human or autopilot) make decisions about mobile platform navigation, such as braking or evasive maneuvers. Contemporary commercial ADAS cameras produce images that have limited or no spectral content: the imagery is either RGB color or monochrome visible-band. Such limited spectral content means that solid objects may have little or no contrast against the sky or other distant background, under many common environmental conditions (e.g., headings and/or times of day).

A real-world example might be where an ADAS fails to detect a relatively large featureless terrestrial obstruction (e.g., an enclosed trailer) relative to the sky/horizon. Such failure can be caused by limited visible differentiation (e.g., color, brightness) in the visible spectrum. Such failure is not uncommon: a white object under an overcast sky will tend to have a brightness very similar to the sky due to diffuse reflection of the sky "dome." Embodiments of a multispectral navigation system described herein are much less likely to fail under similar conditions because it is extremely unlikely that a solid object will emit or reflect light similar to that in the sky over a combination of spectral bands, which may include the visible spectrum and spectrums outside the visible, such as infrared and/or ultraviolet spectrums.

Scenes presented to an imaging navigation system often include areas with very different near-infrared (NIR), visible (VIS), and longwave UV (LWUV) spectral content. A multispectral imaging system that is sensitive to spectrums beyond the visible can more reliably determine the composition of scene content, including being able to reliably differentiate sky from other vehicles, trees, shrubbery, structures, or a roadway, for example. A multispectral imaging system can therefore feed an imaging navigation system with a much more nuanced data stream.

For example, simultaneous measurements in selected bands provides a coarse reflectance/emittance spectrum of surface materials in a scene. Materials like vegetation reflect sunlight with a distinctive spectral signature, while the sky emits a different spectrum. Vehicles and road surfaces also appear different in such selected bands than they do in the visible band. There are several advantages to using a small number (e.g., 2, 3, 4, or 5) of relatively wide spectral bands for a multispectral camera, as opposed to many closely-spaced relatively narrow spectral channels. A wider spectral band (e.g., usually associated with a wide bandpass filter) typically means that there will be more scene flux reaching a detector and result in better exposures in low light conditions. A wider spectral band also allows for shorter integration times, which reduces motion blurring, a particular problem associated with the edges of images captured by forward-looking systems installed in fast-moving vehicles with relatively high angular rates of motion.

Such multispectral imaging capture and processing techniques can be used with aircraft as well, including unmanned aerial systems. For example, a UAV with autonomous operational capability may be implemented with imaging systems that can help a human or autopilot make decisions about what to do in different flight situations, including during takeoff, landing, and evasive action. A multispectral imaging system with image analytics can provide processed sensor information about the physical environment, thereby helping the pilot steer away from obstacles, such as a white blank billboard that might have the same visible-band radiance as overcast sky behind the billboard. The multispectral imagery can also help determine where vegetation is, which can help the mobile platform avoid landing in a tree. The multispectral imagery can also help the mobile platform know where the sky is in an imaged scene because the sky typically has a distinct multispectral signature. The multispectral imagery can also help a UAS reliably and accurately locate other UASs in the sky, which can be extremely useful for aerial maneuvers such as UAS swarming.

In addition to the above, embodiments may be made relatively compactly, thereby reducing size, weight, and power requirements (relative to conventional systems), and are therefore suitable for deployment in various applications such as relatively small unmanned terrestrial vehicles and aircraft systems. Modern manned and unmanned mobile platforms, including unmanned sensor platforms, such as unmanned aerial vehicles (UAVs), remotely operated underwater vehicles (ROVs), unmanned (water) surface vehicles (USVs), and unmanned ground vehicles (UGVs), are able to operate over long distances and in all environments. Such systems typically rely on a portable power source that can limit their range of travel. Embodiments described herein provide relatively lightweight, compact, and featureful multispectral navigation systems that typically increase the achievable range of such mobile platforms, including unmanned sensor platforms, which can be particularly helpful when attempting to navigate within a survey area relatively quickly and exhaustively.

In various embodiments, multispectral imagery and/or other sensor data may be transmitted to a base station, either in real-time or after a survey, which may be configured to combine the sensor data with a map or floor plan of a survey area to present the sensor data in a survey map over the spatial extents of the map or floor plan. Such map or floor plan may be two or three dimensional. The survey map may be stored at the base station and, if the base station includes a display, be presented in real time as a graphically overlaid map to an operator/user. During operation, such map may provide insight for navigating a mobile platform or positioning a mobile platform for stationary observation, for example, or, if operation is to be undertaken in the same area at a future time, such map may provide information for route planning of future operations.

FIG. 1 illustrates a block diagram of multispectral navigation system 100 in accordance with an embodiment of the disclosure. In some embodiments, system 100 may be configured to fly over a scene, through a structure, or approach a target and image or sense the scene, structure, or target, or portions thereof, using gimbal system 122 to aim multispectral imaging system/sensor payload 140 and/or sensor cradle 128 to aim environmental sensor 160 at the scene, structure, or target, or portions thereof. Resulting imagery and/or other sensor data may be processed (e.g., by sensor payload 140, platform 110, and/or base station 130) and displayed to a user through use of user interface 132 (e.g., one or more displays such as a multi-function display (MFD), a portable electronic device such as a tablet, laptop, or smart phone, or other appropriate interface) and/or stored in memory for later viewing and/or analysis. In some embodiments, system 100 may be configured to use such imagery and/or other sensor data to control operation of platform 110, sensor payload 140, and/or environmental sensor 160, as described herein, such as controlling gimbal system 122 to aim sensor payload 140 towards a particular direction or controlling propulsion system 124 to move and/or orient platform 110 to a desired position/orientation in a scene or structure or relative to a target.

In additional embodiments, system 100 may be configured to use platform 110 and/or sensor cradle 128 to position and/or orient environmental sensor 160 at or relative to the scene, structure, or target, or portions thereof. Resulting sensor data may be processed (e.g., by environmental sensor 160, platform 110, and/or base station 130) and displayed to a user through use of user interface 132 (e.g., one or more displays such as a multi-function display (MFD), a portable electronic device such as a tablet, laptop, or smart phone, or other appropriate interface) and/or stored in memory for later viewing and/or analysis. In some embodiments, system 100 may be configured to use such sensor data to control operation of platform 110 and/or environmental sensor 160, as described herein, such as controlling propulsion system 124 to move and/or orient platform 110 to a desired position in a scene or structure or relative to a target.

In the embodiment shown in FIG. 1, multispectral navigation system 100 includes platform 110, optional base station 130, and at least one multispectral imaging system 140. Platform 110 may be a mobile platform configured to move or fly and position multispectral imaging system 140 and/or environmental sensor 160 (e.g., relative to a designated or detected target). As shown in FIG. 1, platform 110 may include one or more of a controller 112, an orientation sensor 114, a gyroscope/accelerometer 116, a global navigation satellite system (GNSS) 118, a communication module 120, a gimbal system 122, a propulsion system 124, a sensor cradle 128, and other modules 126. Operation of platform 110 may be substantially autonomous and/or partially or completely controlled by optional base station 130, which may include one or more of a user interface 132, a communication module 134, and other modules 136. In other embodiments, platform 110 may include one or more of the elements of base station 130, such as with various types of manned aircraft, terrestrial vehicles, and/or surface or subsurface watercraft.

Sensor payload 140 and/or environmental sensor 160 may be physically coupled to platform 110 and be configured to capture sensor data (e.g., visible spectrum images, infrared images, ultraviolet images, narrow aperture radar data, analyte sensor data, directional radiation data, and/or other sensor data) of a target position, area, and/or object(s) as selected and/or framed by operation of platform 110 and/or base station 130. In some embodiments, one or more of the elements of system 100 may be implemented in a combined housing or structure that can be coupled to or within platform 110 and/or held or carried by a user of system 100.

Controller 112 may be implemented as any appropriate logic device (e.g., processing device, microcontroller, processor, application specific integrated circuit (ASIC), field programmable gate array (FPGA), memory storage device, memory reader, or other device or combinations of devices)

that may be adapted to execute, store, and/or receive appropriate instructions, such as software instructions implementing a control loop for controlling various operations of platform 110 and/or other elements of system 100, for example. Such software instructions may also implement methods for processing infrared images and/or other sensor signals, determining sensor information, providing user feedback (e.g., through user interface 132), querying devices for operational parameters, selecting operational parameters for devices, or performing any of the various operations described herein (e.g., operations performed by logic devices of various devices of system 100).

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of system 100. For example, controller 112 may be adapted to store sensor signals, sensor information, parameters for coordinate frame transformations, calibration parameters, sets of calibration points, and/or other operational parameters, over time, for example, and provide such stored data to a user using user interface 132. In some embodiments, controller 112 may be integrated with one or more other elements of platform 110, for example, or distributed as multiple logic devices within platform 110, base station 130, and/or sensor payload 140.

In some embodiments, controller 112 may be configured to substantially continuously monitor and/or store the status of and/or sensor data provided by one or more elements of platform 110, sensor payload 140, environmental sensor 160, and/or base station 130, such as the position and/or orientation of platform 110, sensor payload 140, and/or base station 130, for example, and the status of a communication link established between platform 110, sensor payload 140, environmental sensor 160, and/or base station 130. Such communication links may be configured to be established and then transmit data between elements of system 100 substantially continuously throughout operation of system 100, where such data includes various types of sensor data, control parameters, and/or other data.

Orientation sensor 114 may be implemented as one or more of a compass, float, accelerometer, and/or other device capable of measuring an orientation of platform 110 (e.g., magnitude and direction of roll, pitch, and/or yaw, relative to one or more reference orientations such as gravity and/or Magnetic North), gimbal system 122, imaging system/sensor payload 140, and/or other elements of system 100, and providing such measurements as sensor signals and/or data that may be communicated to various devices of system 100. Gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of platform 110 and/or other elements of system 100 and providing such measurements as sensor signals and/or data that may be communicated to other devices of system 100 (e.g., user interface 132, controller 112).

GNSS 118 may be implemented according to any global navigation satellite system, including a GPS, GLONASS, and/or Galileo based receiver and/or other device capable of determining absolute and/or relative position of platform 110 (e.g., or an element of platform 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of system 100. In some embodiments, GNSS 118 may include an altimeter, for example, or may be used to provide an absolute altitude.

Communication module 120 may be implemented as any wired and/or wireless communication module configured to transmit and receive analog and/or digital signals between elements of system 100. For example, communication module 120 may be configured to receive flight control signals and/or data from base station 130 and provide them to controller 112 and/or propulsion system 124. In other embodiments, communication module 120 may be configured to receive images and/or other sensor information (e.g., visible spectrum, infrared, and/or ultraviolet still images or video images) from sensor payload 140 and relay the sensor data to controller 112 and/or base station 130. In further embodiments, communication module 120 may be configured to receive sensor data and/or other sensor information from environmental sensor 160 and relay the sensor data to controller 112 and/or base station 130. In some embodiments, communication module 120 may be configured to support spread spectrum transmissions, for example, and/or multiple simultaneous communications channels between elements of system 100. Wireless communication links may include one or more analog and/or digital radio communication links, such as WiFi and others, as described herein, and may be direct communication links established between elements of system 100, for example, or may be relayed through one or more wireless relay stations configured to receive and retransmit wireless communications.

In some embodiments, communication module 120 may be configured to monitor the status of a communication link established between platform 110, sensor payload 140, and/or base station 130. Such status information may be provided to controller 112, for example, or transmitted to other elements of system 100 for monitoring, storage, or further processing, as described herein. Communication links established by communication module 120 may be configured to transmit data between elements of system 100 substantially continuously throughout operation of system 100, where such data includes various types of sensor data, control parameters, and/or other data, as described herein.

In some embodiments, gimbal system 122 may be implemented as an actuated gimbal mount, for example, that may be controlled by controller 112 to stabilize sensor payload 140 relative to a target or to aim sensor payload 140 according to a desired direction and/or relative position. As such, gimbal system 122 may be configured to provide a relative orientation of sensor payload 140 (e.g., relative to an orientation of platform 110) to controller 112 and/or communication module 120 (e.g., gimbal system 122 may include its own orientation sensor 114). In other embodiments, gimbal system 122 may be implemented as a gravity driven mount (e.g., non-actuated). In various embodiments, gimbal system 122 may be configured to provide power, support wired communications, and/or otherwise facilitate operation of articulated sensor/sensor payload 140. In further embodiments, gimbal system 122 may be configured to couple to a laser pointer, range finder, and/or other device, for example, to support, stabilize, power, and/or aim multiple devices (e.g., sensor payload 140 and one or more other devices) substantially simultaneously. In alternative embodiments, multispectral imaging system/sensor payload 140 may be fixed to mobile platform 110 such that gimbal system 122 is implemented as a fixed perspective mounting system for sensor payload 140.

Propulsion system 124 may be implemented as one or more propellers, turbines, or other thrust-based propulsion systems, and/or other types of propulsion systems that can be used to provide motive force and/or lift to platform 110 and/or to steer platform 110. In some embodiments, propulsion system 124 may include multiple propellers (e.g., a tri, quad, hex, oct, or other type "copter") that can be controlled (e.g., by controller 112) to provide lift and motion for platform 110 and to provide an orientation for platform 110. In other embodiments, propulsion system 124 may be configured primarily to provide thrust while other structures of platform 110 provide lift, such as in a fixed wing embodiment (e.g., where wings provide the lift) and/or an aerostat embodiment (e.g., balloons, airships, hybrid aerostats).

In various embodiments, propulsion system 124 may be implemented with a portable power supply, such as a battery and/or a combustion engine/generator and fuel supply, for example, that may be coupled to a transmission and/or drive train for propulsion system 124 and/or platform 110. In further embodiments, propulsion system 124 may be implemented with braking system 125, for example, which may be used or controlled to damp or eliminate motion of platform 110, such as an electromechanically controlled disk or drum based braking system for use with terrestrial vehicles, including passenger vehicles.

Other modules 126 may include other and/or additional sensors, actuators, communication modules/nodes, and/or user interfaces/interface devices, for example, and may be used to provide additional environmental information related to operation of platform 110, for example. In some embodiments, other modules 126 may include a humidity sensor, a wind and/or water temperature sensor, a barometer, an altimeter, an analyte detection system, a radar system, a proximity sensor, a visible spectrum camera or infrared/thermal camera (with an additional mount), an irradiance detector, and/or other environmental sensors providing measurements and/or other sensor signals that can be displayed to a user and/or used by other devices of system 100 (e.g., controller 112) to provide operational control of platform 110 and/or system 100.

In some embodiments, other modules 126 may include one or more actuated and/or articulated devices (e.g., multispectrum active illuminators, visible and/or IR cameras, radars, sonars, and/or other actuated devices) coupled to platform 110, where each actuated device includes one or more actuators adapted to adjust an orientation of the device, relative to platform 110, in response to one or more control signals (e.g., provided by controller 112). In particular, other modules 126 may include a stereo vision system configured to provide image data that may be used to calculate or estimate a position of platform 110, for example, or to calculate or estimate a relative position of a navigational hazard in proximity to platform 110. In various embodiments, controller 130 may be configured to use such proximity and/or position information to help safely pilot platform 110 and/or monitor communication link quality, as described herein.

Ranging sensor system 127 may be implemented as a radar, sonar, lidar, and/or other ranging sensor system fixed relative to platform 110, imaging system 140, and/or environmental sensor 160, and be configured to provide two and/or three dimensional ranging sensor data corresponding to a depth map overlapping a field of view of imaging system 140 and/or environmental sensor 160 and/or substantially centered about the optical axis of imaging system 140 and/or environmental sensor 160.

In embodiments where ranging sensor system 127 is implemented as a radar system, ranging sensor system 127 may be implemented as one or more electrically and/or mechanically coupled controllers, transmitters, receivers, transceivers, signal processing logic devices, various electrical components, antenna elements of various shapes and sizes, multichannel antennas/antenna modules, radar assemblies, assembly brackets, and/or various actuators adapted to adjust orientations of any of the components ranging sensor system 127, as described herein. For example, in various embodiments, ranging sensor system 127 may be implemented according to various radar system arrangements that can be used to detect features of and objects on or above a terrestrial surface or a surface of a body of water, for instance, and/or their relative velocities (e.g., their Doppler velocities).

More generally, ranging sensor system 127 may be configured to emit one, multiple, or a series of radar beams (e.g., remote sensor beams), receive corresponding radar returns (e.g., remote sensor returns), and convert the radar returns into radar data and/or imagery (e.g., remote sensor image data), such as one or more intensity plots and/or aggregation of intensity plots indicating a relative position, orientation, and/or other characteristics of structures, weather phenomena, waves, other mobile structures, surface boundaries, and/or other maneuvering obstacles and/or objects reflecting the radar beams back at ranging sensor system 127. Ranging sensor system 127 may be configured to provide such data and/or imagery to a user interface of platform 110 and/or base station 130 for display to a user, for example, or to controller 112 for additional processing, as described herein. Moreover, such data may be used to generate one or more charts corresponding to AIS data, ARPA data, MARPA data, and or one or more other target tracking and/or identification protocols.

In some embodiments, ranging sensor system 127 may be implemented using a compact design, where multiple radar antennas, sensors, and/or associated processing devices are located within a single radar assembly housing that is configured to interface with the rest of system 100 through a single cable providing both power and communications to and from ranging sensor system 127. In some embodiments, ranging sensor system 127 may include orientation and/or position sensors configured to help provide two or three-dimensional waypoints, increase radar data and/or imagery quality, and/or provide highly accurate radar image data, as described herein.

Conventional radar systems can be expensive and bulky and typically cannot be used to provide relatively accurate and/or distortion free radar image data. Embodiments of ranging sensor system 127 include low cost single, dual, and/or multichannel (e.g., synthetic aperture) radar systems that can be configured to produce detailed two and three-dimensional radar data and/or imagery. In some embodiments, ranging sensor system 127 may consolidate electronics and transducers into a single waterproof package to reduce size and cost, for example, and may be implemented with a single connection to other devices of system 100 (e.g., via an Ethernet cable with power over Ethernet, an integral power cable, and/or other communication and/or power transmission conduits integrated into a single interface cable).

In various embodiments, ranging sensor system 127 may be implemented with its own dedicated orientation and/or position sensors (e.g., similar to orientation sensor 114, gyroscope/accelerometer 116, and/or GNSS 118) that may be incorporated within a radar assembly housing to provide three dimensional orientations and/or positions of the radar assembly and/or antenna(s) for use when processing or post processing radar data for display. The sensor information can be used to correct for movement of the radar assembly during and/or between beam emissions to provide improved alignment of corresponding radar returns/samples, for example, and/or to generate imagery based on the measured orientations and/or positions of the radar assembly/antenna. In other embodiments, an external orientation and/or position sensor can be used alone or in combination with an integrated sensor or sensors.

In embodiments where ranging sensor system 127 is implemented with one or more position sensors, ranging sensor system 127 may be configured to provide a variety of radar data and/or imagery enhancements. For example, ranging sensor system 127 may be configured to provide accurate positioning and/or orienting of radar data and/or user-defined waypoints remote from platform 110. Similarly, ranging sensor system 127 may be configured to provide accurate two and/or three-dimensional aggregation and/or display of a series of radar data; without either orientation data or position data to help determine a track or heading, a radar system typically assumes a straight track, which can cause image artifacts and/or other inaccuracies in corresponding radar data and/or imagery. Additionally, when implemented with a position sensor, ranging sensor system 127 may be configured to generate accurate and detailed intensity plots of maneuvering obstacles without access to a magnetometer.

In embodiments where ranging sensor system 127 is implemented with an orientation and/or position sensor, ranging sensor system 127 may be configured to store such location/position information along with other sensor information (radar returns, temperature measurements, text descriptions, altitude, platform speed, and/or other sensor and/or control information) available to system 100. In some embodiments, controller 112 may be configured to generate a look up table so that a user can select desired configurations of ranging sensor system 127 for a particular location or to coordinate with some other sensor information. Alternatively, an automated adjustment algorithm can be used to select optimum configurations based on the sensor information.

In various embodiments, ranging sensor system 127 may also be implemented with a colocated imaging system (e.g., imaging system 140), which may include one or more various types of imaging modules that may be incorporated within the radar assembly housing to provide image data substantially contemporaneous with radar data for use when processing or post processing radar data for display. The image data can be used to improve operator understanding of the radar data and to increase the overall functionality of system 100. For example, embodiments may include one or multiple imaging modules such that the imaging modules rotate with a radar antenna of ranging sensor system 127 to generate a panorama corresponding to a radar plan position indicator (PPI) display view. Embodiments provide methods of data processing, data fusion, and displaying the data and user interaction, as described herein. In further embodiments, ranging sensor system 127 may be implemented as a radar system implemented as and/or configured to operate similar to embodiments described in U.S. patent application Ser. No. 16/0007,908 filed Jun. 13, 2018 and entitled "VEHICLE BASED RADAR UPSAMPLING," now U.S. Pat. No. 10,928,512, which are hereby incorporated by reference in their entirety.

In various embodiments, sensor cradle 128 may be implemented as a latching mechanism that may be permanently mounted to platform 110 to provide a mounting position and/or orientation for environmental sensor 160 relative to a center of gravity of platform 110, relative to propulsion system 124, and/or relative to other elements of platform 110. In addition, sensor cradle 128 may be configured to provide power, support wired communications, and/or otherwise facilitate operation of environmental sensor 160, as described herein. As such, sensor cradle 128 may be configured to provide a power, telemetry, and/or other sensor data interface between platform 110 and environmental sensor 160. In some embodiments, gimbal system 122 may be implemented similarly to sensor cradle 128, and vice versa.

For example, sensor cradle 128 may be implemented as an actuated gimbal mount, for example, that may be controlled by controller 112 to stabilize environmental sensor 160 relative to a target or to aim environmental sensor 160 according to a desired direction and/or relative position. As such, sensor cradle 128 may be configured to provide a relative orientation of environmental sensor 160 (e.g., relative to an orientation of platform 110) to controller 112 and/or communication module 120 (e.g., sensor cradle 128 may include its own orientation sensor 114). In other embodiments, sensor cradle 128 may be implemented as a gravity driven mount (e.g., non-actuated). In further embodiments, sensor cradle 128 may be configured to couple to a laser pointer, range finder, and/or other device, for example, to support, stabilize, power, and/or aim multiple devices (e.g., environmental sensor 160 and one or more other devices) substantially simultaneously.

User interface 132 of base station 130 may be implemented as one or more of a display, a touch screen, a keyboard, a mouse, a joystick, a knob, a steering wheel, a yoke, and/or any other device capable of accepting user input and/or providing feedback to a user. In various embodiments, user interface 132 may be adapted to provide user input (e.g., as a type of signal and/or sensor information transmitted by communication module 134 of base station 130) to other devices of system 100, such as controller 112. User interface 132 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 132 may be adapted to display a time series of various sensor information and/or other parameters as part of or overlaid on a graph or map, which may be referenced to a position and/or orientation of platform 110 and/or other elements of system 100. For example, user interface 132 may be adapted to display a time series of positions, headings, and/or orientations of platform 110 and/or other elements of system 100 overlaid on a geographical map, which may include one or more graphs indicating a corresponding time series of actuator control signals, sensor information, and/or other sensor and/or control signals.

In some embodiments, user interface 132 may be adapted to accept user input including a user-defined target destination, heading, waypoint, route, and/or orientation for an element of system 100, for example, and to generate control signals to cause platform 110 to move according to the target destination, heading, route, and/or orientation, or to aim sensor payload 140 or environmental sensor 160 accordingly. In other embodiments, user interface 132 may be adapted to accept user input modifying a control loop parameter of controller 112, for example.

In further embodiments, user interface 132 may be adapted to accept user input including a user-defined target attitude, orientation, and/or position for an actuated or articulated device (e.g., sensor payload 140 or environmental sensor 160) associated with platform 110, for example, and to generate control signals for adjusting an orientation and/or position of the actuated device according to the target attitude, orientation, and/or position. Such control signals may be transmitted to controller 112 (e.g., using communication modules 134 and 120), which may then control platform 110 accordingly.

Communication module 134 may be implemented as any wired and/or wireless communication module configured to transmit and receive analog and/or digital signals between elements of system 100. For example, communication module 134 may be configured to transmit flight control signals from user interface 132 to communication module 120 or 144. In other embodiments, communication module 134 may be configured to receive sensor data (e.g., visible spectrum, infrared, and/or ultraviolet still images or video images, or other sensor data) from sensor payload 140. In some embodiments, communication module 134 may be configured to support spread spectrum transmissions, for example, and/or multiple simultaneous communications channels between elements of system 100. In various embodiments, communication module 134 may be configured to monitor the status of a communication link established between base station 130, sensor payload 140, and/or platform 110 (e.g., including packet loss of transmitted and received data between elements of system 100, such as with digital communication links), as described herein. Such status information may be provided to user interface 132, for example, or transmitted to other elements of system 100 for monitoring, storage, or further processing, as described herein.

Other modules 136 of base station 130 may include other and/or additional sensors, actuators, communication modules/nodes, and/or user interface devices used to provide additional environmental information associated with base station 130, for example. In some embodiments, other modules 136 may include a humidity sensor, a wind and/or water temperature sensor, a barometer, a radar system, a visible spectrum camera, an infrared or thermal camera, a GNSS, and/or other environmental sensors providing measurements and/or other sensor signals that can be displayed to a user and/or used by other devices of system 100 (e.g., controller 112) to provide operational control of platform 110 and/or system 100 or to process sensor data to compensate for environmental conditions, such as an water content in the atmosphere approximately at the same altitude and/or within the same area as platform 110 and/or base station 130, for example. In some embodiments, other modules 136 may include one or more actuated and/or articulated devices (e.g., multi-spectrum active illuminators, visible and/or IR cameras, radars, sonars, and/or other actuated devices), where each actuated device includes one or more actuators adapted to adjust an orientation of the device in response to one or more control signals (e.g., provided by user interface 132).

In embodiments where imaging system/sensor payload 140 is implemented as an imaging device, imaging system/sensor payload 140 may include imaging module 142, which may be implemented as a cooled and/or uncooled array of detector elements, such as visible spectrum, infrared, and/or ultraviolet sensitive detector elements, including quantum well infrared photodetector elements, bolometer or microbolometer based detector elements, type II superlattice based detector elements, and/or other infrared spectrum detector elements that can be arranged in a focal plane array (FPA) (e.g., along with other detector elements sensitive to other spectrums). In various embodiments, imaging module 142 may be implemented with a complementary metal oxide semiconductor (CMOS) based FPA of detector elements that are sensitive to portions of the visible, near-infrared (NIR), and long wave ultraviolet (LWUV) spectrums simultaneously. In various embodiments, imaging module 142 may include one or more logic devices (e.g., similar to controller 112) that can be configured to process imagery captured by detector elements of imaging module 142 before providing the imagery to memory 146 or communication module 144. More generally, imaging module 142 may be configured to perform any of the operations or methods described herein, at least in part, or in combination with controller 112 and/or user interface 132.

In some embodiments, sensor payload 140 may be implemented with a second or additional imaging modules similar to imaging module 142, for example, that may include detector elements configured to detect other electromagnetic spectrums, such as visible light, thermal, ultraviolet, and/or other electromagnetic spectrums or subsets of such spectrums. In various embodiments, such additional imaging modules may be calibrated or registered to imaging module 142 such that images captured by each imaging module occupy a known and at least partially overlapping field of view of the other imaging modules, thereby allowing different spectrum images to be geometrically registered to each other (e.g., by scaling and/or positioning). In some embodiments, different spectrum images may be registered to each other using pattern recognition processing in addition or as an alternative to reliance on a known overlapping field of view.

Communication module 144 of sensor payload 140 may be implemented as any wired and/or wireless communication module configured to transmit and receive analog and/or digital signals between elements of system 100. For example, communication module 144 may be configured to transmit images from imaging module 142 to communication module 120 or 134. In other embodiments, communication module 144 may be configured to receive control signals (e.g., control signals directing capture, focus, selective filtering, and/or other operation of sensor payload 140) from controller 112 and/or user interface 132. In some embodiments, communication module 144 may be configured to support spread spectrum transmissions, for example, and/or multiple simultaneous communications channels between elements of system 100. In various embodiments, communication module 144 may be configured to monitor the status of a communication link established between sensor payload 140, base station 130, and/or platform 110 (e.g., including packet loss of transmitted and received data between elements of system 100, such as with digital communication links), as described herein. Such status information may be provided to imaging module 142, for example, or transmitted to other elements of system 100 for monitoring, storage, or further processing, as described herein.

Memory 146 may be implemented as one or more machine readable mediums and/or logic devices configured to store software instructions, sensor signals, control signals, operational parameters, calibration parameters, infrared images, and/or other data facilitating operation of system 100, for example, and provide it to various elements of system 100. Memory 146 may also be implemented, at least in part, as removable memory, such as a secure digital memory card for example including an interface for such memory.

Orientation sensor 148 of sensor payload 140 may be implemented similar to orientation sensor 114 or gyroscope/accelerometer 116, and/or any other device capable of measuring an orientation of sensor payload 140, imaging module 142, and/or other elements of sensor payload 140 (e.g., magnitude and direction of roll, pitch, and/or yaw, relative to one or more reference orientations such as gravity and/or Magnetic North) and providing such measurements as sensor signals that may be communicated to various devices of system 100. Gyroscope/accelerometer (e.g., angular motion sensor) 150 of sensor payload 140 may be implemented as one or more electronic sextants, semiconductor devices, integrated chips, accelerometer sensors, accelerometer sensor systems, or other devices capable of measuring angular velocities/accelerations (e.g., angular motion) and/or linear accelerations (e.g., direction and magnitude) of sensor payload 140 and/or various elements of sensor payload 140 and providing such measurements as sensor signals that may be communicated to various devices of system 100. GNSS 149 may be implemented similar to GNSS 118 and/or any other device capable of measuring a position of sensor payload 140, imaging module 142, and/or other elements of sensor payload 140 and providing such measurements as sensor signals that may be communicated to various devices of system 100.

Other modules 152 of sensor payload 140 may include other and/or additional sensors, actuators, communication modules/nodes, cooled or uncooled optical filters, and/or user interface devices used to provide additional environmental information associated with sensor payload 140, for example. In some embodiments, other modules 152 may include a humidity sensor, a wind and/or water temperature sensor, a barometer, a radar system, a visible spectrum camera, an infrared camera, a GNSS, and/or other environmental sensors providing measurements and/or other sensor signals that can be displayed to a user and/or used by imaging module 142 or other devices of system 100 (e.g., controller 112) to provide operational control of platform 110 and/or system 100 or to process imagery to compensate for environmental conditions.

In various embodiments, environmental sensor/sensor payload 160 may be implemented as an environmental sensor configured to generate environmental sensor data corresponding to the environment surrounding platform 110. In the embodiment shown in FIG. 1, environmental sensor 160 includes sensor controller 162, memory 163, communication module 164, sensor assembly 166, orientation and/or position sensor (OPS) 167, power supply 168, and other modules 170. In various embodiments, sensor assembly 166 may be implemented with sensor elements configured to detect the presence of and/or generate sensor data corresponding to hazardous analytes, ionizing radiation, emissivities, thermal radiation, radio frequency signals, and/or other environmental conditions proximate to or in view of platform 110 and/or environmental sensor 160.

Sensor controller 162 may be implemented as one or more of any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of environmental sensor 160 and/or other elements of environmental sensor 160, for example. Such software instructions may also implement methods for processing sensor signals, determining sensor information, providing user feedback (e.g., through user interface 132), querying devices for operational parameters, selecting operational parameters for devices, or performing any of the various operations described herein.

In addition, a non-transitory medium may be provided for storing machine readable instructions for loading into and execution by sensor controller 162. In these and other embodiments, sensor controller 162 may be implemented with other components where appropriate, such as volatile memory, non-volatile memory, one or more interfaces, and/or various analog and/or digital components for interfacing with modules of environmental sensor 160 and/or devices of system 100. For example, sensor controller 162 may be adapted to store sensor signals, sensor information, parameters for coordinate frame transformations, calibration parameters, sets of calibration points, and/or other operational parameters, over time, for example, and provide such stored data to a user using user interface 132. In some embodiments, sensor controller 162 may be integrated with one or more other elements of environmental sensor 160, for example, or distributed as multiple logic devices within platform 110, base station 130, and/or environmental sensor 160.

In some embodiments, sensor controller 162 may be configured to substantially continuously monitor and/or store the status of and/or store sensor data provided by one or more elements of sensor assembly 166 of environmental sensor 160, such as the position and/or orientation of platform 110, environmental sensor 160, and/or base station 130, for example, and the status of a communication link established between platform 110, environmental sensor 160, and/or base station 130. Such communication links may be configured to be established and then transmit data between elements of system 100 substantially continuously throughout operation of system 100, where such data includes various types of sensor data, control parameters, and/or other data.

Memory 163 may be implemented as one or more machine readable mediums and/or logic devices configured to store software instructions, sensor signals, control signals, operational parameters, calibration parameters, sensor data, and/or other data facilitating operation of environmental sensor 160 and/or other elements of system 100, for example, and provide it to various elements of system 100. Memory 163 may also be implemented, at least in part, as removable memory, such as a secure digital memory card for example including an interface for such memory.

Communication module 164 of environmental sensor 160 may be implemented as any wired and/or wireless communication module configured to transmit and receive analog and/or digital signals between elements of system 100. For example, communication module 164 may be configured to transmit sensor data from environmental sensor 160 and/or sensor assembly 166 to communication module 120 of platform 110 (e.g., for further transmission to base station 130) or directly to communication module 134 of base station 130. In other embodiments, communication module 164 may be configured to receive control signals (e.g., control signals directing operation of environmental sensor 160) from controller 112 and/or user interface 132. In some embodiments, communication module 164 may be configured to support spread spectrum transmissions, for example, and/or multiple simultaneous communications channels between elements of system 100.

Sensor assembly 166 may be implemented with one or more sensor element supports (e.g., printed circuit boards "PCBs"), connectors, sensor elements, and/or other modules configured to facilitate operation of environmental sensor 160. In a particular embodiment, environmental sensor 160 may be implemented as a relatively high resolution visible spectrum camera (e.g., an HD or 2K or 4K visible spectrum camera) and sensor assembly 166 may be implemented as a relatively high resolution FPA of visible spectrum sensitive detector elements configured to generate relatively high resolution imagery and/or video of a scene imaged substantially simultaneously by multispectral imaging system 140.

Orientation and/or position sensor (OPS) 167 of environmental sensor 160 may be implemented similar to orientation sensor 114, gyroscope/accelerometer 116, GNSS 118, and/or any other device capable of measuring an orientation and/or position of environmental sensor 160, sensor assembly 166, and/or other elements of environmental sensor 160 (e.g., magnitude and direction of roll, pitch, and/or yaw, relative to one or more reference orientations such as gravity and/or Magnetic North, along with an absolute or relative position) and providing such measurements as sensor signals that may be communicated to various devices of system 100.

Power supply 168 may be implemented as any power storage device configured to provide enough power to each sensor element of sensor assembly 166 to keep all such sensor elements active and able to generate sensor data while environmental sensor 160 is otherwise disconnected from external power (e.g., provided by platform 110 and/or base station 130). In various embodiments, power supply 168 may be implemented by a supercapacitor so as to be relatively lightweight and facilitate flight of platform 110 and/or relatively easy handheld operation of platform 110 (e.g., where platform 110 is implemented as a handheld sensor platform).

Other modules 170 of environmental sensor 160 may include other and/or additional sensors, actuators, communication modules/nodes, and/or user interface devices used to provide additional environmental information associated with environmental sensor 160, for example. In some embodiments, other modules 170 may include a humidity sensor, a wind and/or water temperature sensor, a barometer, a GNSS, and/or other environmental sensors providing measurements and/or other sensor signals that can be displayed to a user and/or used by sensor controller 162 or other devices of system 100 (e.g., controller 112) to provide operational control of platform 110 and/or system 100 or to process sensor data to compensate for environmental conditions, as described herein.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 100.

In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements.

Each element of system 100 may include one or more batteries, capacitors, or other electrical power storage devices, for example, and may include one or more solar cell modules or other electrical power generating devices. In some embodiments, one or more of the devices may be powered by a power source for platform 110, using one or more power leads. Such power leads may also be used to support one or more communication techniques between elements of system 100.

Figure 2:
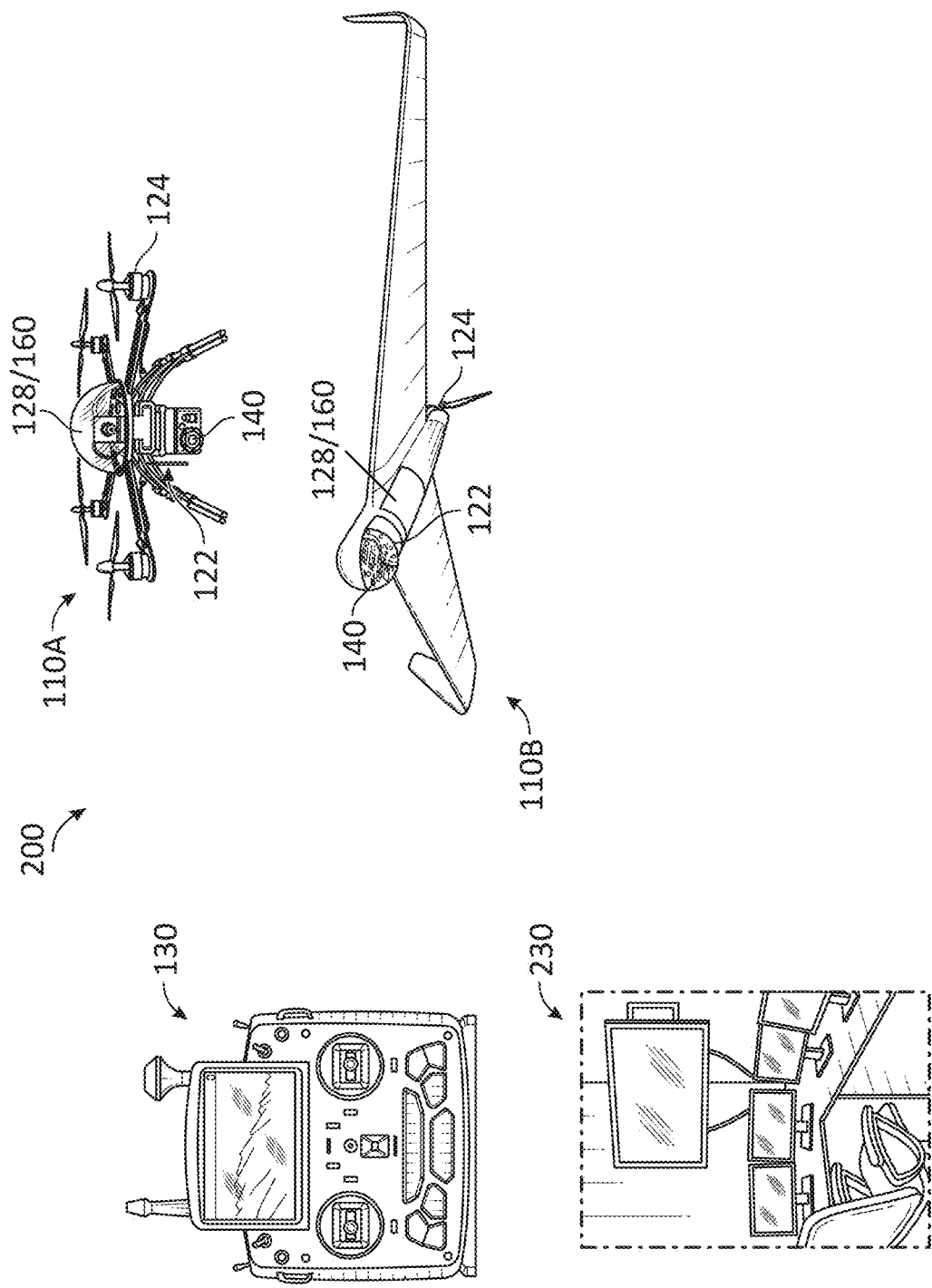
FIG. 2 illustrates a diagram of mobile platforms employing a multispectral navigation system in accordance with an embodiment of the disclosure.

FIG. 2 illustrates a diagram of mobile platforms 110A and 110B of multispectral navigation system 200 including embodiments of environmental sensor 160 and associated sensor cradle 128 in accordance with an embodiment of the disclosure. In the embodiment shown in FIG. 2, multispectral navigation system 200 includes base station 130, optional co-pilot station 230, mobile platform 110A with articulated imaging system/sensor payload 140, gimbal system 122, environmental sensor 160, and sensor cradle 128, and mobile platform 110B with articulated imaging system/sensor payload 140, gimbal system 122, environmental sensor 160, and sensor cradle 128, where base station 130 and/or optional co-pilot station 230 may be configured to control motion, position, orientation, and/or general operation of platform 110A, platform 110B, sensor payloads 140, and/or environmental sensors 160.

In various embodiments, co-pilot station 230 may be implemented similarly relative to base station 130, such as including similar elements and/or being capable of similar functionality. In some embodiments, co-pilot station 230 may include a number of displays so as to facilitate operation of environmental sensor 160 and/or various imaging and/or sensor payloads of mobile platforms 110A-B, generally separate from piloting mobile platforms 110A-B, and to facilitate substantially real time analysis, visualization, and communication of sensor data and corresponding directives, such as to first responders in contact with a co-pilot or user of system 200. For example, base station 130 and co-pilot station 230 may each be configured to render any of the display views described herein.

As described herein, embodiments of multispectral navigation system 100 may be implemented with a relatively compact, low weight, and low power multispectral imaging system (e.g., multispectral imaging system 140) that can be used to help operate a mobile platform, such as through assisted navigation, where processed imagery and/or display views are provided to an operator to help the operator pilot the mobile platform, or through autopilot navigation, where such imagery is used to autopilot the mobile platform according to a desired route, destination, or other operational parameters.

In some embodiments, a multispectral imaging system may include an imaging module implemented by a CMOS based FPA formed, fabricated, assembled, and/or otherwise configured to have sensitivity in the IR, VIS, and UV spectrums/bands. Such imaging module may include a Bayer filter configured to generate a mosaic or pattern of IR, VIS, and UV pixels in the FPA such that each image captured by the multispectral imaging module includes IR, VIS, and UV information about each scene imaged by the multispectral imaging module. In particular embodiments, such FPA may be sensitive to portions of the NIR, VIS, and LWUV spectrums, including at least 400-750 nm (VIS), 750-1100 nm (NIR), and 330-400 nm (LWUV), and the Bayer filter may be configured to selectively pass such bands according to a particular mosaic or pattern.

In some embodiments, such Bayer filter may be deposited directly onto the FPA, for example, and/or may form a checkerboard-like mosaic similar to mosaics used for RGB VIS imaging. Any one of the VIS, NIR, or LWUV spectrums may be emphasized or deemphasized relative to the other two spectrums in resulting imagery according to a particular mosaic selected for the Bayer filter and/or according to a particular demosaicing algorithm (e.g., based on one or more of interpolation, spectral correlation, spatial correlation, and/or other demosaicing technique).

In some embodiments, a particular demosaicing algorithm may be selected based on one or more environmental conditions associated with an imaged scene or object, for example, or associated with an operational state, position, or orientation of mobile platform 110 and/or imaging module 142 of multispectral imaging system 140. For example, a particular demosaicing algorithm may be configured to deemphasize horizon-aligned polarized VIS, NIR, and/or LWUV contributions to a captured image based on a time of day (e.g., a position of the sun in the sky), a position of mobile platform 110, and/or an orientation of mobile platform 110 and/or multispectral imaging system 140, so as to reduce image artifacts (e.g., pixel saturation artifacts) caused by relatively strong reflections of ambient light from horizon-aligned surfaces. In another example, a particular demosaicing algorithm may be configured to emphasize UV contributions to a captured image based on a time of day (e.g., a level of natural ambient light provided by the sun) a position of mobile platform 110 (e.g., geographical position and altitude to place mobile platform 110 within a topographical map of the horizon), and/or an orientation of mobile platform 110 and/or multispectral imaging system 140, when the UV contribution is expected to relatively low (e.g., while the sun is below the horizon).

Such Bayer filter may be implemented as a mosaic of single band pass filters (e.g., each pixel receiving only one of the passed IR, VIS, UV bands), for example, or may be implemented as a mosaic of notched broadband transmission filters (e.g., each pixel receiving all but one of the notched/filtered IR, VIS, UV bands). In embodiments where the Bayer filter is implemented as a mosaic of notched broadband transmission filters, the selected principal bands may be synthesized from linear combinations of two or more pixels receiving differentiated spectrums (e.g., associated with spectrally differentiated notched broadband transmission filters). In various embodiments, such synthesis may be implemented within/included as part of a demosaicing algorithm, as described herein. Such techniques can provide increased signal to noise characteristics relative to filter implemented by mosaics of single band pass filters.

In various embodiments, multispectral imaging system 140 is capable of operating at reasonably high frame rates so that resulting image streams are contemporaneous enough to be useful for navigation of a mobile platform (e.g., where an operator or autopilot often needs to make time-critical maneuvering decisions). For example, embodiments are able to operate (e.g., capture and process imagery) at frame rates approaching approximately 100 frames/second or higher.

In particular embodiments, multispectral imaging system 140 is capable of cycling an integration time associated with an FPA of imaging module 142 over two or more preset values so that multispectral imaging system 140 can produce high dynamic range (HDR) imagery in all imaged bands. Such HDR mode may be used to provide midwell exposure values over a variety of lighting conditions, for example, and in some embodiments, the integration times may be determined and/or adjusted by multispectral imaging system 140 based on ambient light level (e.g., in one or more spectrums), contrast levels in prior captured multispectral images, and/or other environmental sensor data and/or derived or processed sensor data and/or imagery. This can be particularly important where, for example, the solar spectrum has very different scene brightnesses in IR, VIS, and UV, and the scene spectrum varies with the diurnal cycle.

A midwell exposure value refers to an exposure event where the integration capacitor for a sensor element in a CMOS based embodiment of an FPA of imaging module 142 (e.g., FPA 374 of multispectral imaging system 140 of FIG. 3) is allowed to charge to approximately half its capacity before being read out (e.g., discharged) by module controller 372 across PCB 375 (e.g., both of imaging module 142. For example, the readout frequency and/or the exposure time (e.g., controlled by a mechanical, electromechanical, and/or electronic, such LCD, embodiment of shutter 349) may be adjusted based, at least in part, on the average scene radiance (e.g., of a specific band or across multiple bands, as selected by filter system 376), so that a majority of the sensor elements of FPA 374 associated with one or more bands captured by FPA 374 are operating roughly at their midwell exposure values. Operating at such midwell exposure values results in image data captured within the most linear portion of the dynamic range of FPA 374 (e.g., providing a substantially linear response to photons being intercepted by sensor elements of FPA 374), which helps avoid image noise associated with, for example, low well charge levels. By cycling through different exposure times (e.g., integration times), embodiments are able to achieve midwell operating performance for each of the bands captured by multispectral imaging system 140.

For example, VIS radiance in a scene will often be higher than the NIR or LWUV radiance in the scene. An exposure/integration time of 5 milliseconds might provide midwell exposure levels for NIR and LWUV sensor elements (e.g., as selected by filter system 376) but overexpose VIS sensor elements of FPA 374. Multispectral imaging system 140 may be configured to capture a first image according to the first 5 millisecond exposure time, then capture a second image according to a second shorter exposure time, and then combine the NIR and LWUV components of the first image with the VIS component of the second image to generate an HDR image (e.g., as long the first and second images are captured one after the other and/or while multispectral imaging system 140 or at least FOV 345 is substantially stationary with respect to scene 302).

In various embodiments, multispectral imaging system 140 may be equipped with a lens system that is achromatic across the spectral bands captured by imaging module 142. Such lens system may be implemented with a focal length chosen to provide a relatively wide field of view (FOV) that is sufficient with respect to navigation system and UAS imaging FOV requirements (e.g., mission, specification, and/or regulatory requirements).

In some embodiments, multispectral imaging system 140 may be configured to process captured imagery according to multispectral image analytics and/or algorithms (e.g., on-board or after transmission to other processing elements of system 100) configured to classify scene pixels according to their likelihood of being part of a particular class of object. For example, clear sky has a distinctive spectrum to it, being darker in the NIR and brighter in the UV. Vehicles, even those painted white, tend to have the opposite spectrum: bright in the NIR band and dark in the UV band. Both scene elements can therefore be reliably classified based, at least in part, on their spectral characteristics. In various embodiments, such multispectral image analytics and/or algorithms may be performed by a convolutional neural network (CNN) implemented within multispectral imaging system 140, for example, or within one or more controllers associated with multispectral navigation system 100.

In particular embodiments, image data provided by multispectral imaging system 140 and/or imaging module 142 may be encoded using two bytes per pixel, where 12 bits encode image data (e.g., intensity) and the remaining four bits encode information about a classification probability associated with the pixel, such as a 95% probability the pixel is sky or not sky. Such data may then be used by multispectral navigation system 100 to make maneuvering (e.g., braking and steering) decisions substantially in real time (e.g., at 100+ frames/second instances in time).

Figure 3:
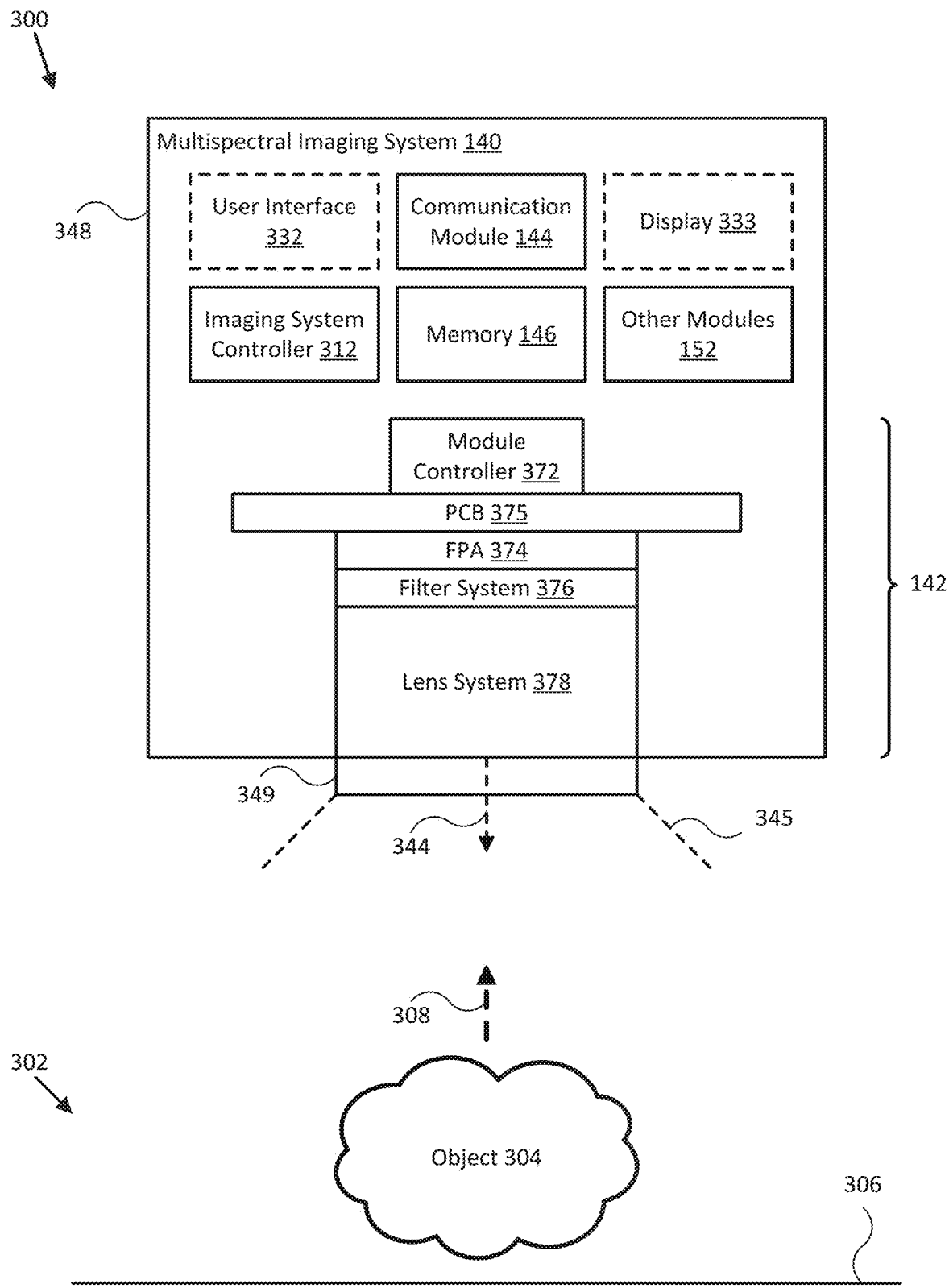
FIG. 3 illustrates a diagram of a multispectral imaging system for a multispectral navigation system in accordance with an embodiment of the disclosure.

FIG. 3 illustrates a diagram of multispectral imaging system 140 for multispectral navigation system 100 and/or 300 in accordance with an embodiment of the disclosure. In FIG. 3, multispectral imaging system 140 includes imaging module 142 including multispectral FPA 374 receiving light 308 from scene 302 through filter system 376, lens system 378, and/or optional shutter 349 along optical axis 344 and according to FOV 345. In various embodiments, imaging module 142 may include a printed circuit board (PCB) 375 or similar structure configured to support FPA 374 and couple FPA 374 and/or other elements of imaging module 142 to module controller 372 of imaging module 142. As described herein, filter system 376 may in some embodiments be implemented as a Bayer filter with a selected mosaic configured to provide differentiated spectrums (e.g., portions of VIS, IR, and UV spectrums) to pixels of FPA 374. As is also described herein, lens system 378 may be achromatic with respect to the differentiated spectrums provided to pixels of FPA 374, for example, and be configured to provide FOV 345. In some embodiments, lens system 378 may be actuated so as to adjust FOV 345, a zoom level of multispectral imaging system 140, and/or a focus of light conveyed to FPA 374. In other embodiments, lens system 378 may be a fixed lens system.

Module controller 372 may be implemented as any appropriate processing device (e.g., microcontroller, processor, application specific integrated circuit (ASIC), field programmable gate array (FPGA), or other logic device) that may be used by imaging module 142 and/or multispectral imaging system 140 to execute appropriate instructions, such as software instructions and/or signal processing operations for, for example, capturing multispectral images of scene 302 using FPA 374, filter system 376, lens system 378, and/or shutter 349, demosaicing raw pixel data associated with such multispectral images, and/or classifying pixels in such images associated with object 304 and/or background 306 within scene 302 (e.g., using a CNN implemented within module controller 372). Further, module controller 372 may be implemented with various signal processing devices, such as analog to digital converters (ADCs), trigger inputs, timing circuitry, and other signal or sensor processing devices as described herein.

In various embodiments, FPA 374 may be implemented by a two-dimensional planar array of similarly fabricated/sized pixel structures each configured to be sensitive across the full spectral band of imaging module 142. In other embodiments, FPA 374 may be implemented by an array of structurally differentiated pixel structure subarrays, where each subarray is sensitive to a differentiated subset of the full spectral band of imaging module 142, for example, and/or may be non-planar (e.g., concave with respect to optical axis 344), three dimensional (e.g., multilayered), and/or may include size differentiated pixels (e.g., with larger surface areas as the distance to optical axis 344 increases).

Filter system 376 may be implemented as a static Bayer filter structure deposited or otherwise attached to an active surface of FPS 374, for example, or may be implemented as an adjustable or controllable Bayer filter structure or other type of filter structure configured to provide pixel- or FPA-portion-differentiated spectral illumination of FPA 374. In a specific example, such Bayer filter may be implemented with two VIS pixels for each NIR and LWUV pixel (e.g., similar to some Bayer filter patterns for color VIS cameras with green—2 pixels—and red and blue—1 pixel each). Such filters may be implemented as multilayer dielectric interference-type bandpass filters. More generally, filter system 376 may be configured to provide spatially and spectrally differentiated illumination of FPA 374 according to two or more, or three or more different spectrums, each of which may be full differentiated or may partially overlap an adjacent differentiated spectrum. In one embodiment, the characteristics of filter system 376 may include a NIR band of 780-1000 nm, a LWUV band of 370 nm with 60 nm full width half maximum (FWHM), and a typical VIS band.

In other embodiments, filter system 376 may be implemented at least partially by a multivariate optical element filter array (e.g., a multivariate filter or filter array). Such special interference filters are typically configured according to relatively complex engineered transmission curves that are designed to perform optical computing operations, such as operations that are analogous to a dot product between a scaled regression vector and the spectroscopic response of the scene. For example, a regression vector is commonly a consequence of the design of the filter and may be optimized for specific spectra of interest. In one embodiments, there such filter may include array with 3 or perhaps more distinct multivariate optical elements (MOEs) in a selected pattern. An MOE array designed to specifically detect scene spectra like vegetation, clear sky, overcast sky, road surfaces and vehicles may offer advantages over a simple 3-band approach. Such MOE filters can be constructed of relatively few layers than conventional bandpass filters, so they are often physically thinner than bandpass filters, which makes them an attractive choice for a filter array where the pixels of the FPA may have dimensions that are comparable to filter layer stack thicknesses. Such MOE filters may also tend to have better overall scene flux throughput (e.g., when they are composed of fewer layers than a comparable bandpass filter array).

Lens system 378 may be implemented with one or more lenses each configured to pass light to substantially all pixels of FPA 374, for example, or may be implemented with an array of lenses (e.g., a microlens array) each configured to pass light to a subset of pixels of FPA 374. In general, in embodiments where FPA is sensitive to the NIR, VIS, and LWUV bands, as described herein, each lens of lens system 378 may be configured to be color corrected or achromatic from 330-1100 nm. In some embodiments, FOV 345 may be asymmetrical (e.g., to match a corresponding FPA dimension) and be approximately 42 by 34 degrees.

While the embodiment depicted by FIG. 3 shows a relatively compact multispectral imaging system 140 implemented with a single multispectral imaging module 142 capable of providing single perspective multispectral imagery of scene 302, in other embodiments, multispectral imaging system 140 may be implemented with multiple imaging modules 142 each sensitive to individually differentiated spectrums, for example, and/or each providing different perspectives of scene 302, such as according to different optical axes and/or different FOVs).

PCB 375 may be a conventional printed circuit board, for example, and be adapted to provide electrical access to FPA 374 and/or other elements of imaging module 142 (e.g., through various metal traces) as well as physical support for FPA 374 and/or other elements of imaging module 142. In some embodiments, shutter 349 may be implemented as a mechanical or removable light shield adapted to selectively block one or more bands of light 308. In various embodiments, shutter 349 may be actuated (e.g., opened and/or closed) electronically by module controller 372 and/or imaging system controller 312, for example. Shutter 349 may be coupled to/supported by housing 348, for example, and housing 348 may be adapted to protect system 300 from environmental conditions associated with space or atmospheric flight, and/or other outdoor environmental conditions, such as fixed or articulated mounting on a terrestrial vehicle, for example. In other embodiments, housing 348 may be adapted for handheld use.

As shown in FIG. 3, multispectral imaging system 140 may be implemented with a variety of other components adapted to facilitate operation of multispectral imaging system 140, including capturing multispectral images of scene 302, demosaicing images of scene 302, detecting characteristics of (e.g., presence, extents, range, translucency, visible color, and/or other characteristics) and/or classifying object 304 and background 306 of scene 302 (e.g., as sky or not sky, maneuvering obstruction or not maneuvering obstruction, mobile target or not mobile target, vegetation or not vegetation, road/earth or not road/earth, water surface or not water surface, and/or likelihood thereof), and/or reporting such sensor data to other elements of system 100 as described herein. In some embodiments, system 300 may report sensor data by aggregating sensor data over time (e.g., multiple frames) to provide a time-duration-based reliability of such characteristics and/or classifications determined by system 300, and then transmitting the sensor data to other elements of system 100. In other embodiments, system 300 may report sensor data by energizing an LED indicator and/or transmitting an alert or notification signal to a component (e.g., an alarm, or an electrical switch or relay) of systems 300 or 100.

Each of imaging sensor controller 312, memory 146, user interface 332, communication module 144, display 333, and other modules 152, if optionally included in multispectral imaging system 140, may be coupled to PCB 375 or to housing 348, for example, depending on a desired application and/or overall size of multispectral imaging system 140 and/or imaging module 142. In other embodiments, any one or group of such components may be implemented externally to multispectral imaging system 140, for example, and/or in a distributed or grouped manner (e.g., multiple imaging system controllers 312 operating multispectral imaging system 140, or multiple multispectral imaging systems 140 operated by a single imaging system controller 312).

Imaging system controller 312 may be implemented as any appropriate processing device (e.g., microcontroller, processor, application specific integrated circuit (ASIC), field programmable gate array (FPGA), or other logic device) that may be used by system 300 to execute appropriate instructions, such as software instructions and/or signal processing operations for, for example, capturing multispectral images of scene 302 using imaging module 142, demosaicing raw pixel data associated with such multispectral images, classifying pixels and/or elements of scene 302 in such images (e.g., using a CNN implemented within imaging system controller 312), and/or reporting such sensor data/information to other elements of multispectral navigation system 100 or 300. Further, imaging system controller 312 may be implemented with various signal processing devices, such as analog to digital converters (ADCs), trigger inputs, timing circuitry, and other signal or sensor processing devices as described herein.

In various embodiments, at least some portion or some functionality of imaging system controller 312 may be part of or implemented with other existing controllers or logic devices of separate systems, such as a server, a personal electronic device (e.g., a mobile phone, smartphone, tablet device, laptop computer, desktop computer), and/or any other device that may be used to process, report, or act on multispectral images captured by system 300. In other embodiments, imaging system controller 312 may be adapted to interface and communicate with various external controllers or logic devices and associated components and/or perform various operations in a distributed manner.

In general, imaging system controller 312 may be adapted to interface and communicate with other components of system 300 to perform the methods and processes described herein. In one embodiment, imaging system controller 312 may be adapted to use communication module 144 to report multispectral imagery and/or pixel/object classifications to display 333 and render and/or display a such information or an alert notification, for example, or render and/or display an image of a classification map corresponding to scene 302. In another embodiment, imaging system controller 312 may be adapted to use communication module 144 to establish a wired or wireless communication link with a remote reporting system, for example, and report such sensor information.

Memory 146 is typically in communication with at least imaging system controller 312 and may include one or more memory devices (e.g., memory components) to store information, including image data, calibration data, other types of sensor data, and/or software instructions. Such memory devices may include various types of volatile and non-volatile information storage devices, such as RAM (Random Access Memory), ROM (Read-Only Memory), EEPROM (Electrically-Erasable Read-Only Memory), flash memory, a disk drive, and/or other types of memory. In one embodiment, memory 146 may include a portable memory device that can be removed from system 300 and used to convey stored data to other systems for further processing and inspection.

Communication module 144 may be configured to facilitate communication and interfacing between various components of system 300 (e.g., between imaging system controller 312 and memory 146 and/or display 333) and/or various external devices, such as a wireless access point, a personal electronic device, a server, and/or other detectors. For example, components such as user interface 332 and display 333 may transmit and receive data to and from imaging system controller 312 through communication module 144, which may be adapted to manage wired and/or wireless communication links between the various components. As such, communication module 144 may support various interfaces, protocols, and standards for local system networking, such as the controller area network (CAN) bus, the local interconnect network (LIN) bus, the media oriented systems transport (MOST) network, or the ISO 11738 (or ISO bus) standard.

In some embodiments, imaging system controller 312 may be adapted to communicate, via communication module 144, with a remote user interface, a notification system, or other detection systems to, for example, aggregate reports from multiple systems or sensors and/or implement a particular detection and/or notification method. As such, communication module 144 may include a wireless communication component (e.g., based on the IEEE 802.11 WiFi standards, the Bluetooth™ standard, the ZigBee™ standard, or other appropriate short range wireless communication standards), a wireless broadband component (e.g., based on WiMax technologies), a mobile cellular component, a wireless satellite component, or other appropriate wireless communication components. Communication module 144 may also be configured to interface with a wired network and/or device via a wired communication component, such as an Ethernet interface.

If present, user interface 332 provides for user interaction with multispectral imaging system 140 and may include one or more buttons, indicators (e.g., LEDs), keyboards, trackballs, knobs, joysticks, displays (e.g., a liquid crystal display, a touch-screen display), and/or other type of user interface adapted to accept user input and/or provide user feedback. In one embodiment, user interface 332 may include a power button, a vibration motor, an LED to indicate a maneuvering obstruction, and/or a speaker to provide an audible indication of a maneuvering obstruction (e.g., visible, tactile, and/or audible indicators). In various embodiments, user interface 332 may be used to input a variety of system configuration settings, such as integration time parameters, demosaicing algorithm selections, and/or other configuration settings, as described herein. In some embodiments, user interface 332 may be used to view one or more reports, graphs, and/or other image data captured by system 300 and/or processed according to the various operations described herein.

If present, display 333 may be configured to present, indicate, or otherwise convey alerts, notifications, and/or other reports of image data and/or object or pixel classifications (e.g., generated by imaging system controller 312). Display 333 may be implemented with an electronic display screen, such as a liquid crystal display (LCD), a cathode ray tube (CRT), or various other types of generally known video displays and monitors, including touch-sensitive displays. Display 333 may be suitable for presenting image data, graphs, video, reports, or other information as described herein.

Other modules 152 may include a temperature sensor/probe (e.g., a thermocouple, an infrared thermometer), an LED or laser diode, an ambient light sensor, a voltage regulator and/or filter, a variable voltage source, and/or other types of devices that can be used to facilitate operation of multispectral imaging system 140, as described herein. In some embodiments, other modules 152 may include a GNSS, accelerometer, compass, and/or other orientation sensor capable of sensing a position and/or orientation of multispectral imaging system 140. Other modules 152 may additionally include a power module implemented as a battery, a power adapter, a charging circuit, a power interface, a power monitor, and/or other type of power supply providing a mobile power source.

In accordance with embodiments described herein, multispectral navigation systems may benefit from a variety of multispectral imaging and visualization techniques configured to improve the operational flexibility, reliability, and accuracy of such systems. In particular, embodiments may be configured to provide various display views, including augmented reality views based on imagery provided by multispectral imaging system 140 and/or other imagers of system 100, allowing a user to access and monitor such features and capabilities, for example, and may be implemented according to various processes and/or control loops configured to ease pilot burden, protect operation of mobile platforms of such systems, and qualitatively and quantitatively evaluate potential maneuvering obstructions and evasion options more quickly and more reliably than conventional navigation systems.

In various embodiments, system 100 may be configured to visualize and characterize a maneuvering obstruction through use of multispectral imaging system 140 and other sensors mounted to mobile platform 110. In general, mobile platform 110 can relay sensor data to an onboard operator or remote operators at base station 130 and/or co-pilot station 230 where the sensor data can be processed or used to maneuver mobile platform 110. Such sensor data may also be rendered on a display to help visualize and characterize the maneuvering obstacle to assist a human operator with detecting and evading a maneuvering obstruction. For example, elements of system 100 can autonomously map the extents of one or more maneuvering obstacles and overlay resulting sensor data onto a geospatial chart or imagery, such that an operator can visualize the full extent of the maneuvering obstacle(s) and proceed safely. In embodiments where system 100 or 300 includes a handheld mobile platform, elements of system 100 or 300 can aggregate various data to provide critical and timely warnings and/or safety directives to the user of the handheld platform.

Embodiments may overlay 2D or 3D sensor data onto geospatial maps or imagery as icons or colored highlights or blobs so that users can visualize the extent of a maneuvering obstacle. Embodiments may optionally include a second screen/additional base stations so that sensor data can be viewed/processed by a user other than a UAV/UGV pilot.

In some embodiments, a display view (e.g., rendered by user interface 132 and/or display 333) may include a geospatial chart or augmented imagery surrounded by various selector/indicator groups (e.g., a header, payload controller menus, video feed, and platform telemetry indicator) configured to visualize and/or quantify maneuvering obstacles and operate mobile platform 110 and/or elements of mobile platform 110. For example, a header may include one or more selectors and/or indicators configured to receive user selection of a particular selector to enable, disable, or select active sensor payloads (e.g., multispectral imaging system 140, environmental sensor 160) for display of corresponding georeferenced sensor data within a geospatial chart or augmented imagery, for example, or to indicate an operational status of mobile platform 110 and/or various elements of mobile platform 110.

In related embodiments, a geospatial chart or augmented imagery includes a mobile platform indicator and a maneuvering obstacle overlay rendered over a base map or chart. In various embodiments, system 100 may be configured to determine a shape, extent, and/or other characteristics of a maneuvering obstacle overlay within the geospatial chart or augmented imagery based, at least in part, on sensor data provided by multispectral imaging system 140, environmental sensor 160, and orientation and/or position data (e.g., provided by OPS 167 and/or other orientation and/or position or motion sensors of mobile platform 110 or elements of mobile platform 110) as mobile platform 110 maneuvers within the area shown in the geospatial chart or augmented imagery. For example, system 100 may be configured to determine an extent associated with object 304 from the perspective of optical axis 344 based on sensor data and/or environmental conditions provided by mobile platform 110, and render the maneuvering obstruction overlay according to a color mapping to indicate relative range or approaching velocity, such as hot colors (e.g., red) to indicate relatively close or quickly approaching maneuvering obstructions, and cold colors (e.g., blue) to indicate relatively far or quickly receding maneuvering obstructions.

In another embodiment, system 100 may be configured to determine multiple types of maneuvering obstacles are present within a particular survey area or scene, for example, and render each type of maneuvering obstacle according to a different overlay layer presented in a display view, each of which may be selective enabled and/or disabled by a user.

In various embodiments, mobile platform 110 may be configured to adjust its course based on sensor data provided by multispectral imaging system 140 and/or environmental sensor 160, for example, and/or based on various environmental conditions measured by sensors mounted to mobile platform 110 or by external systems and communicated to system 100 (e.g., such as regional weather data provided by an online database over a wireless network linked to base station 130 or co-pilot station 230). As such, mobile platform 110 may be configured to autonomously avoid maneuvering obstacles or hazardous environments (e.g., significant downdrafts or otherwise undesirable environmental conditions and/or maneuvering obstacles within such undesirable environmental conditions). For example, sending a UAV/UGV into a hazardous environment can put mobile platform 110 at risk of damage. By adding intelligent maneuvering obstacle avoidance based on multispectral imagery and environmental sensors carried on-vehicle, risk of collision and/or inefficient maneuvering can be limited through automatic course adjustment, thereby protecting mobile platform 110 and it associated sensor suite.

Embodiments described herein may provide for autonomous reaction to maneuvering obstacles. For example, controller 112 and/or a controller of base station 130 or co-pilot station 230 may be configured to receive multispectral imagery, classification data, and/or other sensor data from mobile platform 110 and/or from sensors mounted to mobile platform 110 and to determine course adjustments to avoid detected maneuvering obstacles and/or environmental conditions. Examples of course adjustments may include halt, divert around, climb, and/or reverse course to retreat from or otherwise avoid a maneuvering obstacle or dangerous environment. Such course adjustments may be relayed to a user of base station 130, for example, or may be implemented directly/autonomously by mobile platform 110. Such autonomous response is intended to preserve the integrity of mobile platform 110 and facilitate reaching a desired destination.

Figure 4:
FIGS. 4-6 illustrate display views including imagery generated by a multispectral imaging system for a multispectral navigation system in accordance with embodiments of the disclosure.
Figure 5:
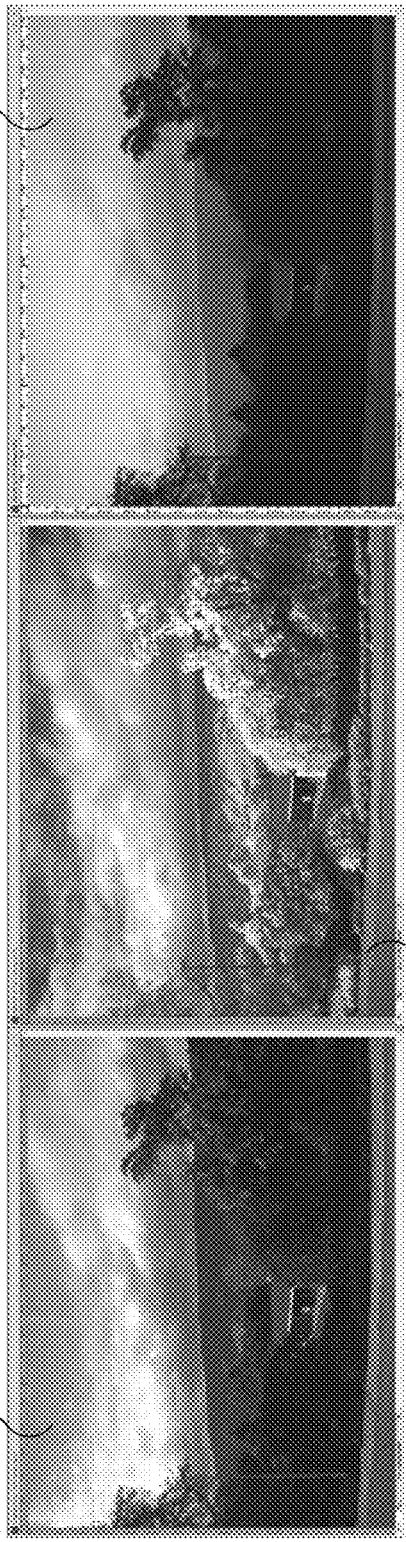
Figure 6:
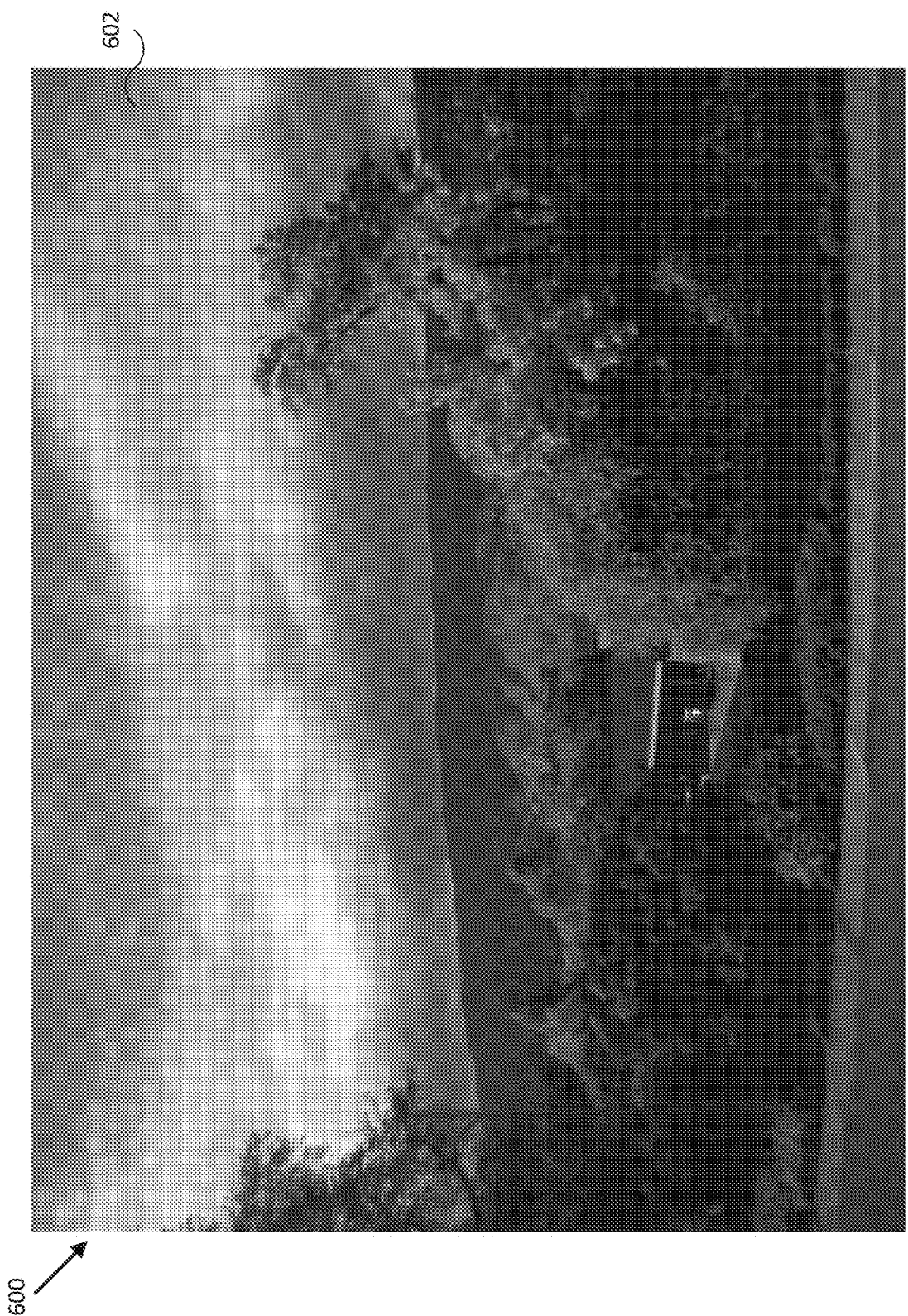

FIGS. 4-6 illustrate display views 400, 500, and 600 including imagery generated by multispectral imaging system 140 for multispectral navigation system 100 or 300 in accordance with embodiments of the disclosure. In FIG. 4, display view 400 shows a relatively high resolution visible spectrum RGB or color image 402 of a neighborhood and various scene elements (e.g., a road, sidewalk, fence, vegetation, and a structure behind the vegetation, with all scene elements beneath a cloudy sky). In FIG. 5, display view 500 shows a monochrome visible spectrum image 502, a NIR image 504, and a LWUV image 506 of the same scene depicted in visible spectrum color image 402. FIG. 6 shows display view 600 including multispectral image 602 including the spectral characteristics of each of monochrome visible spectrum image 502, NIR image 504, and LWUV image 506, where each differentiated spectrum is mapped into the R, G, and B channels typically visible by human eyes (e.g., NIR image data is mapped to the R channel, VIS data is mapped to the G channel, and LWUV data is mapped to the Blue channel).

As can be seen from FIGS. 4-6, the daytime sky spectral signature has a relatively low spectral signature/brightness in NIR imagery, medium spectral signature/brightness in VIS imagery, and relatively very bright spectral signature/brightness in LWUV imagery. As such, objects silhouetted against the sky in LWUV imagery are much easier to segment out from the sky than when using VIS imagery, and multispectral analysis is better able to discriminate between sky and foreground objects, such as other mobile platforms. For example, it is very hard to envision a daytime scenario where both the sky and some closing object have the same apparent radiance in all three of the bands depicted in FIG. 5, simultaneously. Moreover, such multispectral analysis is particularly useful when an object or maneuvering obstacle is beyond a reliable LIDAR range. As such, embodiments are typically able to use simple image subtraction to segment out the sky from other objects in the scene, even when the object look similar in the visible spectrum. Furthermore, an on-board CNN or other machine vision engine (e.g., implemented within module controller 372 and/or imaging system controller 312) could perform pixel and/or object classification rapidly and send multispectral image data including "tagged" pixels or groups of pixels to elements of multispectral navigation system 100 and determine various maneuvering adjustments to avoid maneuvering obstacles, as described herein.

In the various images of FIG. 5, it can be seen that natural light shadows are suppressed in the UV band. For example, Rayleigh scattering typically makes the whole sky glow relatively brightly with scattered UV sunlight. Since the whole sky dome is lit, shadows are less intense in the UV band (e.g., as shown in LWUV image 506). Moreover, many foreground objects in LWUV imagery will tend to look dark, since UV is absorbed by many molecular surfaces. By contrast, shadows tend to be enhanced in the NIR band because there is less Rayleigh scattering (e.g., as shown in NIR image 504). Therefore, subtracting NIR image 504 and LWUV image 506 from each other results in a multispectral image emphasizing which pixels in the image are likely to be shadows (e.g., thereby classifying such pixels as shadow or not shadow, optionally with an associated likelihood).

In another example, white clothing against clean snow is typically invisible or low contrast in VIS imagery, particularly in diffuse ambient light with indistinct or absent shadowing. However, white clothing against clean snow in LWUV imagery is typically very pronounced with relatively high contrast and can be detected fairly easily with CNN analysis and/or image subtraction of the LWUV imagery from the VIS imagery.

Figure 7:
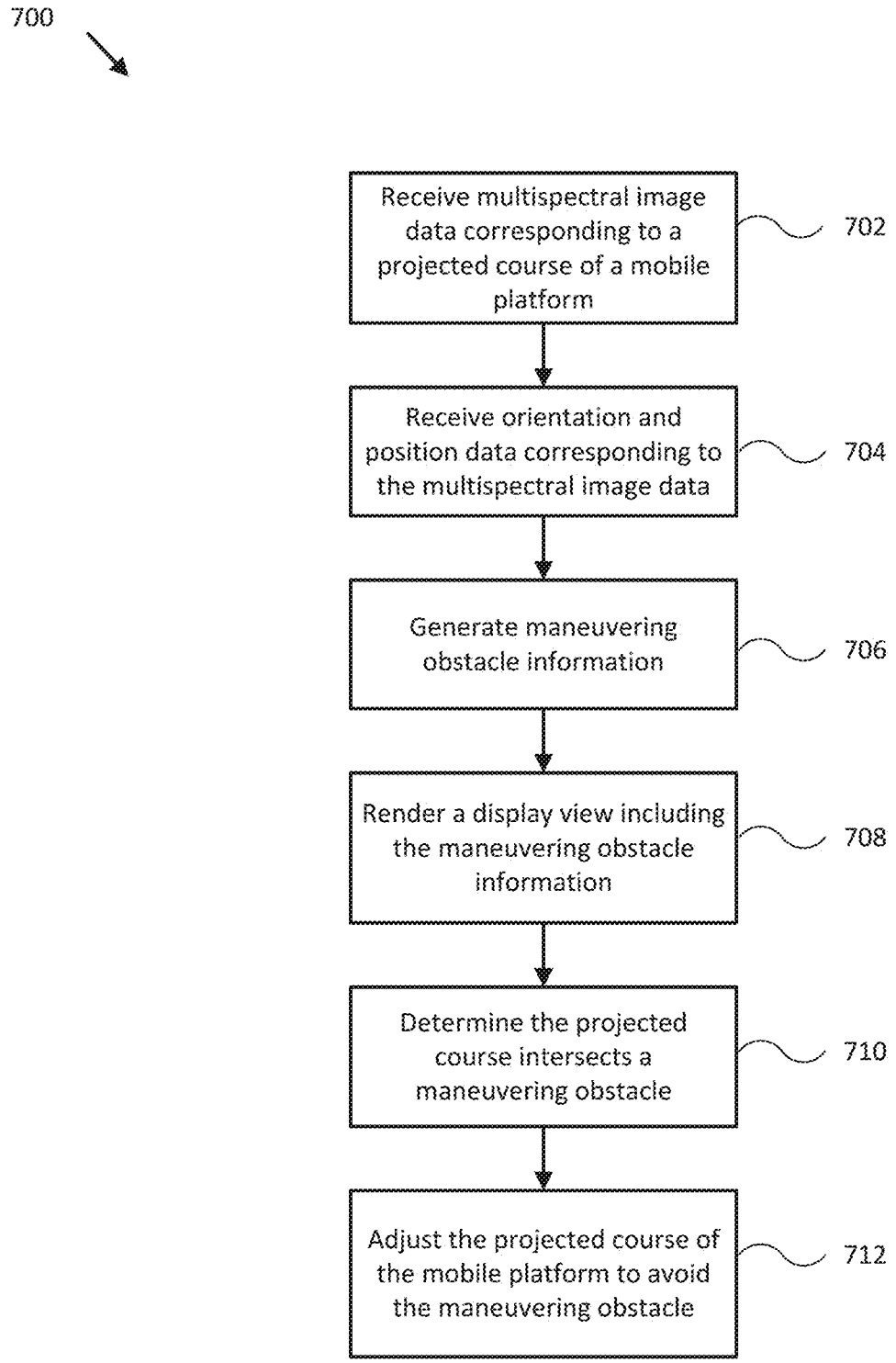
FIG. 7 illustrates a flow diagram of various operations to provide assisted or autopiloted navigation using a multispectral navigation system in accordance with embodiments of the disclosure.

FIG. 7 illustrates a flow diagram 700 of various operations to provide assisted or autopiloted navigation using a multispectral navigation system in accordance with embodiments of the disclosure. In some embodiments, the operations of FIG. 7 may be implemented as software instructions executed by one or more logic devices or controllers associated with corresponding electronic devices, sensors, and/or structures depicted in FIGS. 1-3. More generally, the operations of FIG. 7 may be implemented with any combination of software instructions, mechanical elements, and/or electronic hardware (e.g., inductors, capacitors, amplifiers, actuators, or other analog and/or digital components).

It should also be appreciated that any step, sub-step, sub-process, or block of process 700 may be performed in an order or arrangement different from the embodiments illustrated by FIG. 7. For example, in other embodiments, one or more blocks may be omitted from or added to each individual process. Furthermore, block inputs, block outputs, various sensor signals, sensor information, calibration parameters, and/or other operational parameters may be stored to one or more memories prior to moving to a following portion of a corresponding process. Although process 700 is described with reference to systems described in FIGS. 1-3, process 700 may be performed by other systems different from those systems and including a different selection of electronic devices, sensors, assemblies, mechanisms, platforms, and/or platform attributes.

Process 700 of FIG. 7 may generally correspond to a method for navigating a survey area using multispectral navigation system 100.

At block 702, multispectral image data corresponding to a projected course for a mobile platform is received. For example, controllers 112, 312, and/or 372, communication modules 120, 144, and/or 134, user interface 132, and/or other elements of system 100 may be configured to receive multispectral image data from multispectral imaging system 140 and/or imaging module 142 as mobile platform 110 maneuvers along a projected course (e.g., within scene 302).

In block 704, orientation and position data corresponding to multispectral image data is received. For example, system 100 may be configured to receive orientation and/or position data (e.g., from various orientation, position, and/or other motion sensors of system 100) corresponding to the multispectral image data received in block 702.

In block 706, maneuvering obstacle information is generated. For example, system 100 may be configured to generate maneuvering obstacle information (e.g., indicating a position, extent, and/or other characteristics of object 304 in scene 302) corresponding to the projected course of mobile platform 110 (e.g., within scene 302) based, at least in part, on a combination of the orientation and/or position data and the multispectral image data received in blocks 702 and 704.

In block 708, a display view including maneuvering obstacle information is rendered. For example, system 100 may be configured to render a display view (e.g., display views of FIGS. 4-6) including the maneuvering obstacle information generated in block 706 in a display of user interface 132 and/or in display 333 of multispectral imaging system 140.

In block 710, intersection of a projected course with a maneuvering obstacle area is determined. For example, system 100 may be configured to determine the projected course for mobile platform 110 intersects a position and/or extent of at least one object 304 in scene 302 based, at least in part, on the maneuvering obstacle information generated in block 706.

In block 712, a projected course of a mobile platform is adjusted. For example, system 100 may be configured to adjust the projected course of mobile platform 110 to avoid one or more maneuvering obstacles (e.g., multiple objects 304 in scene 302) intersecting the projected course for mobile platform 110 as determined in block 710. For example, system 100 may be configured to determine an avoidance course configured to avoid all maneuvering obstacles within scene 302 and to reach a predetermined destination or traverse scene 302 generally according to a predetermined heading or approach. In other embodiments, system 100 may be configured to determine a series of avoidance courses configured to avoid individual maneuvering obstacles within scene 302 as mobile platform 110 maneuvers through scene 302.

By providing such systems and techniques for multispectral navigation, embodiments of the present disclosure substantially improve the operational flexibility and reliability of manned and unmanned mobile platforms, including unmanned sensor platforms. Moreover, such systems and techniques may be used to increase the operational safety of users and operators of mobile platforms, including of unmanned mobile sensor platforms, beyond that achievable by conventional systems. As such, embodiments provide multispectral imaging systems and navigation systems with significantly increased operational convenience and performance.

As noted above, another important class of object in a scene that is commonly encountered by vehicles is vegetation. Healthy vegetation strongly reflects NIR radiation, especially in the 800 nm band. A camera system with the ability to measure both visible-band radiance and NIR radiance may be configured to detect the so-called Red Edge: the sharp rise in reflectivity from 700 nm to 800 nm associated with spongy mesophyll tissue in most vegetation.

One algorithm for identifying foliage is the normalized differential vegetative index or NDVI. This metric is used quite often in remote sensing from satellites. The traditional NDVI is most commonly defined as the normalized contrast between the NIR band and the visible red band in multispectral images. With respect to embodiments of the disclosed multispectral imaging system, there often is no separate visible red band, as distinct from visible green or blue, and so the traditional NVDI may be modified to form the mNDVI, to define it according to the contrast between NIR and full visible spectrum light:

$$mNDVI = (NIR - VIS)/(NIR + VIS)$$

Using this definition of the mNDVI, thresholds can be identified and selected to classify pixels in a multispectral image as associated with vegetation in the imaged scene. A typical range of threshold values includes mNDVIs of 0.3-0.4.

Another useful metric may be referred to as the normalized differential sky index or NDSI. For example, there is often strong contrast between LWUV and NIR images of the sky because the Rayleigh scattering cross section varies very strongly with wavelength:

$$\sigma_{Rayleigh} \sim \text{Wavelength}^{-4}$$

The LWUV light will be scattered approximately sixteen times more than NIR light (e.g., with twice the wavelength), which makes the sky appear bright in the LWUV band and dark in the NIR band. This NDSI metric may be defined as:

$$NDSI=(LWUV-NIR)/(LWUV+NIR)$$

Using this definition of the NDSI, thresholds can be identified and selected to classify pixels in a multispectral image as associated with sky in the imaged scene. A typical threshold value includes an NDSI of approximately 0.2.

Figure 8:
FIGS. 8-10 illustrate display views including imagery generated by a multispectral imaging system for a multispectral navigation system in accordance with embodiments of the disclosure.
Figure 9:
Figure 10:
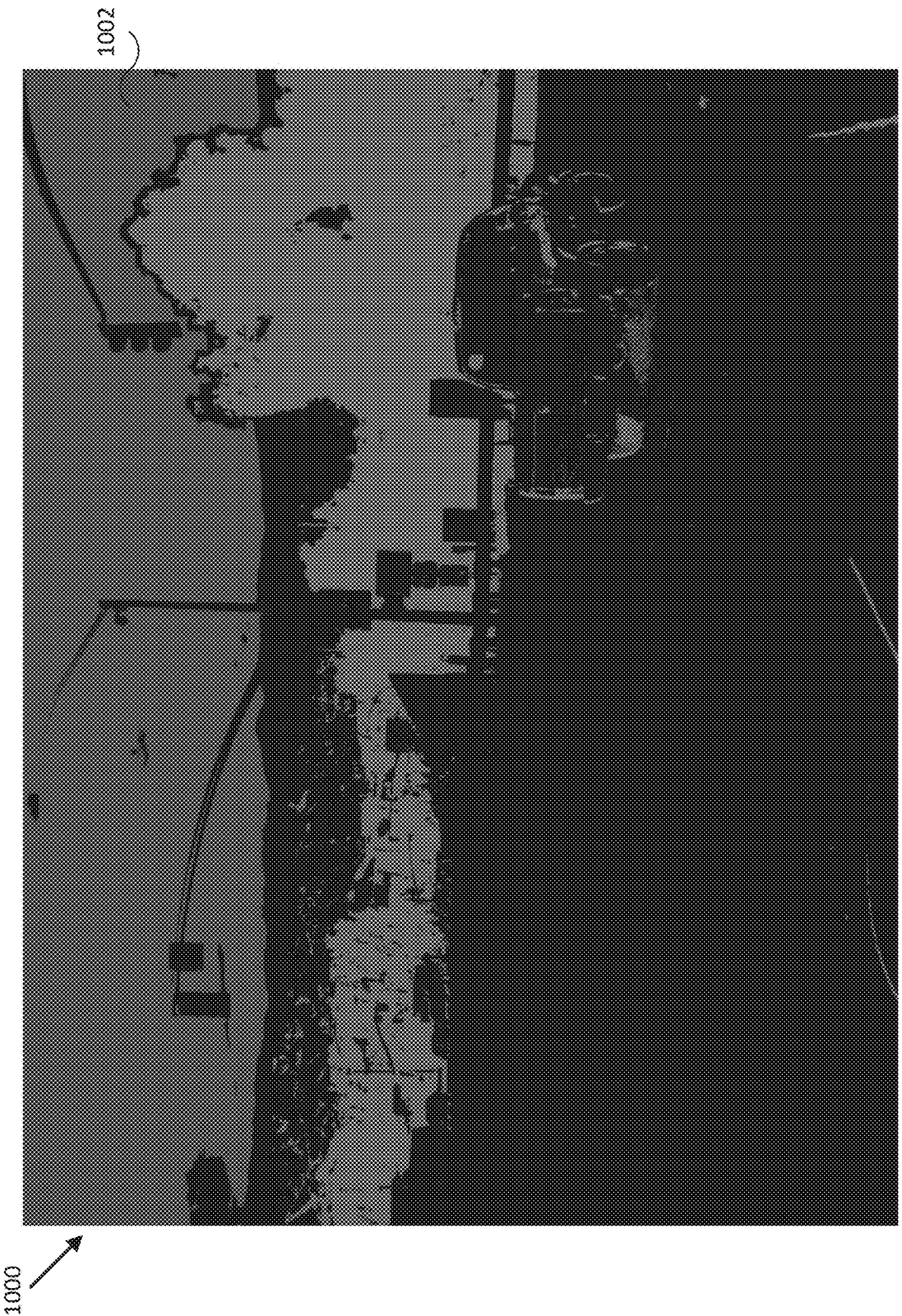

FIGS. 8-10 illustrate display views 800, 900, and 1000 including imagery generated by multispectral imaging system 140 for multispectral navigation system 100 or 300 in accordance with embodiments of the disclosure. FIGS. 8-10 show three views of the same scene. In FIG. 8, display view 800 shows a relatively high resolution visible spectrum RGB or color image 802 of a major intersection with a highway onramp and various scene elements (e.g., streetlights, a road with painted lane and direction indicators, street signs, sidewalks, fencing, vegetation, a bridge, and a mountain range, with all scene elements beneath a clear sky). More generally, FIG. 8 shows a full color visible-light image of a typical ADAS scene.

In FIG. 9, display view 900 shows a multispectral image 902 including the spectral characteristics of each of a VIS image, a NIR image, and a LWUV image of the same scene depicted in visible spectrum color image 802, where each differentiated spectrum is mapped into the R, G, and B channels typically visible by human eyes (e.g., NIR image data is mapped to the R channel, VIS data is mapped to the G channel, and LWUV data is mapped to the Blue channel). FIG. 10 shows display view 1000 including processed image or classification map 1002 that shows vegetation in red, sky in blue, and the remainder in black, as identified pixel by pixel using the mNDVI and the NDSI, along with appropriate thresholds, as described herein. For example, the specific mNDVI and NDSI thresholds used to generate classification map 1002 are 0.35 and 0.2, respectively.

Embodiments of the disclosed multispectral imaging system may be configured to differentiate green-colored objects, such as green road signs, from green vegetation. Such ability makes it easier for an ADAS to identify and segment out green road signs and use optical character recognition to incorporate the information in imaged text into its general data streams. Moreover, a green-colored vehicle is easier to see against green vegetation using measurements from the NIR and VIS bands. By contrast, both green signs and green-colored vehicles on a road or parked next on the side of a road may be at risk of being lost against a backdrop of green vegetation if a conventional color camera is used.

For example, a LWUV image of a highway may provide minimal contrast between a sign and vegetation behind it, but, in the LWUV image, there is typically relatively high contrast between the sky and everything else. A multispectral image of the same scene would therefore be able to show the sky and vegetation clearly delineated from each other. With the spectral mappings provided herein, a road might be depicted in a multispectral image with a yellow-grey color. As such, it is possible to classify the road surface (e.g., using mapped RGB color thresholds) as distinct from both vegetation and sky in the imaged scene, since the multispectral appearance of the road surface is substantially different from that of the sky and the vegetation. Selecting appropriate thresholds, structural morphologies, and/or identifying other classification processing characteristics or techniques may include implementing an appropriate CNN training and classification technique, where the CNN is trained to classify various different image features important to an ADAS.

Using the techniques described herein, embodiments of the multispectral navigation system described herein are able to: identify vegetation, since it is bright in the NIR band, but darker in the other two bands; identify clear sky, since it is bright in the LWUV band, but darker in the other two bands; distinguish red LED taillights from incandescent taillights with red filters; and define the location of car windows by the visible light passing through them. Embodiments are also able to: differentiate man-made surfaces from natural surfaces; differentiate green vehicles from vegetation; differentiate sky-blue vehicles from clear sky; differentiate white vehicles from overcast sky; differentiate icy roads from ice-free roads; and differentiate wet roads from dry roads.

In 2019, vehicle accidents in the United States killed more than 6,000 pedestrians, the highest annual total ever recorded, and sent more than 100,000 to hospitals with injuries. As the automotive industry moves towards autonomous vehicles (AV), the ability to sense, classify, and make split-second artificial intelligence (AI) based maneuvering decisions while driving becomes increasingly necessary. Advanced driver assistance systems (ADAS) and related AV systems are tasked with becoming smarter and safer quickly. Embodiments described herein offer automotive manufacturers, suppliers, regulators, automotive testing agencies, commercial vehicle operators, and consumers systems that maximize safety of drivers, pedestrians, and other vulnerable road users.

Figure 11:
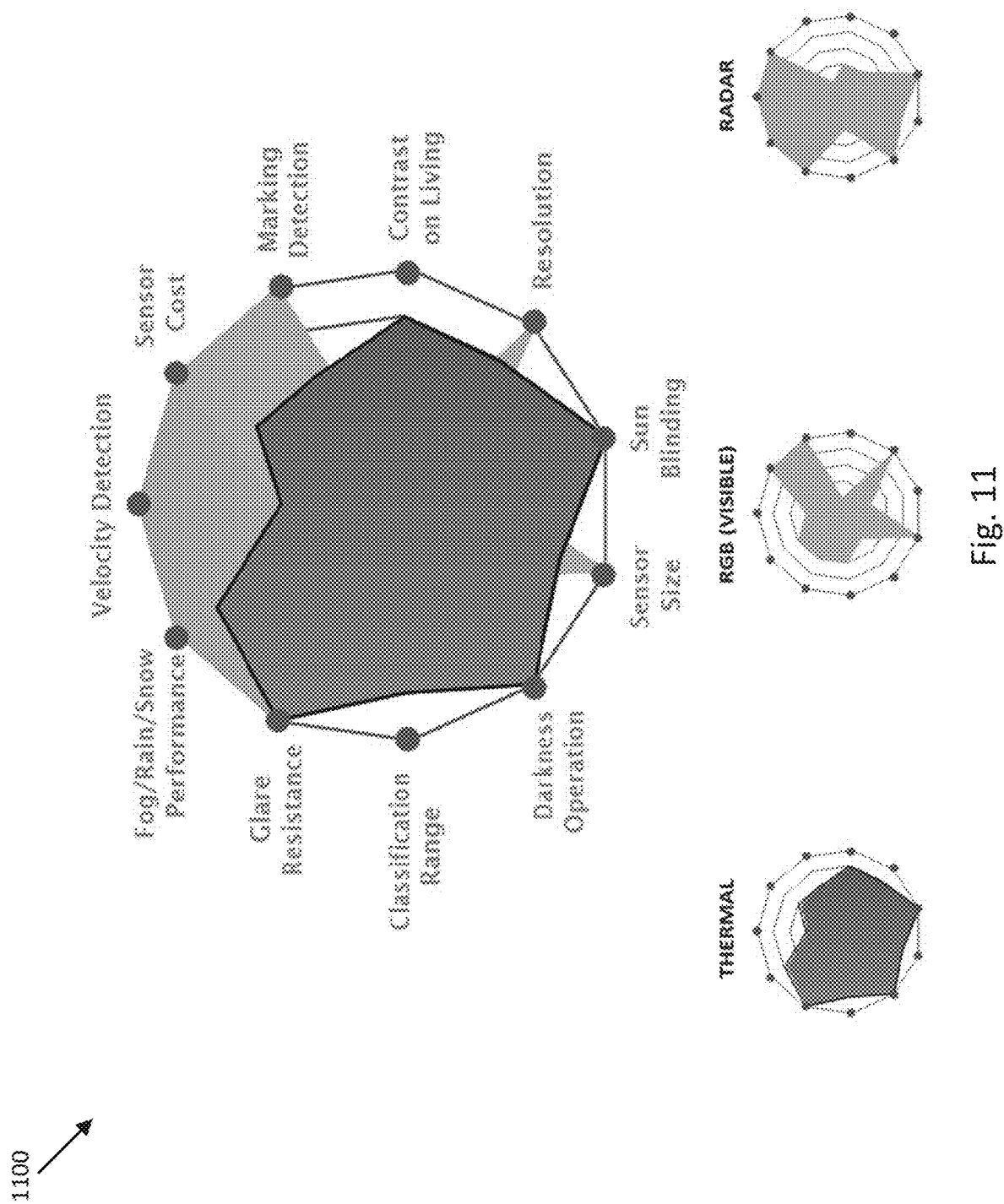
FIG. 11 is a diagram illustrating the functional benefits associated with thermal imaging navigation systems in accordance with an embodiment of the disclosure.

FIG. 11 is a diagram 1100 illustrating the functional benefits associated with thermal imaging navigation systems (e.g., embodiments of multispectral navigation system 100 in FIG. 1) in accordance with an embodiment of the disclosure. In particular, diagram 1100 of FIG. 11 shows how thermal imaging-based navigation systems can provide relatively reliable feature performance over a relatively large portion of the safety feature phase space identified in diagram 1100. Moreover, diagram 1100 of FIG. 11 shows that increased reliable feature performance can be achieved by combining thermal imaging with visible spectrum imaging and/or other remote sensor systems (e.g., radar), where the overlap or fusion of the different feature performances substantially fills the safety feature phase space identified in diagram 1100.

Figure 12:
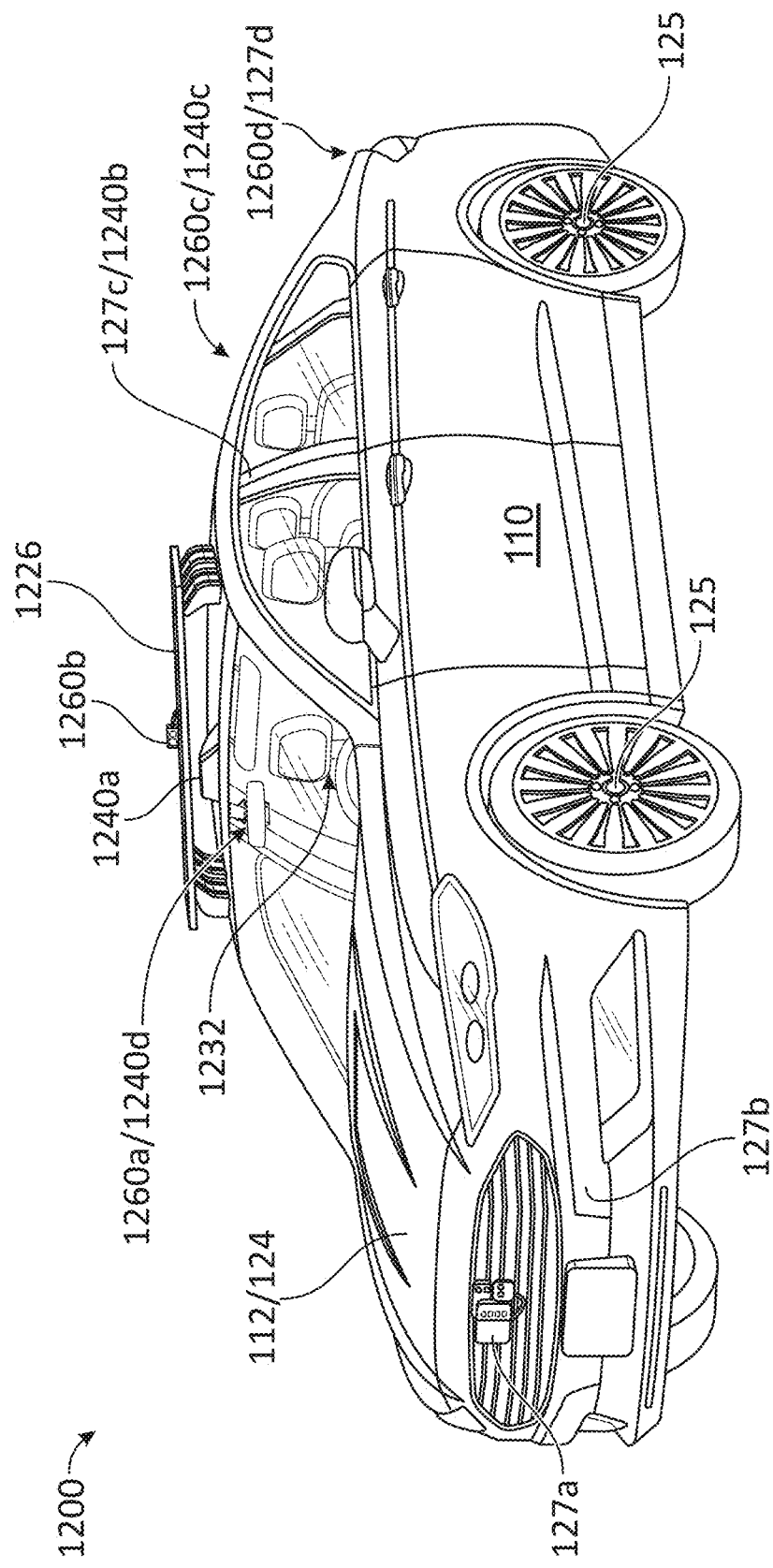
FIG. 12 illustrates a diagram of a mobile platform employing a thermal imaging navigation system in accordance with an embodiment of the disclosure.

FIG. 12 illustrates a diagram of a mobile platform 110 employing a thermal imaging navigation system 1200 in accordance with an embodiment of the disclosure. For example, as described herein, in some embodiments, multispectral navigation system 100 may be implemented as a thermal imaging navigation system, where sensor payload 140 may be implemented as a thermal imaging system 140 including a thermal imaging module 142, environmental sensor 160 may be implemented as a visible spectrum imaging system 160 including a visible spectrum imaging module/sensor assembly 166, and thermal imaging navigation system 100 may include ranging sensor system 127, which may be implemented as a radar or other type of ranging sensor system. In such embodiments, each of thermal imaging system 140, visible spectrum imaging system 160, and ranging sensor system 127 may be mounted to platform 110 so as to have overlapping fields of view (e.g., overlapping sensor data of scene 302).

In particular, thermal imaging navigation system 1200 of FIG. 12 may include one or more of controller 112, propulsion system 124 (e.g., an electric motor or combustion engine or hybrid motor, coupled to a transmission and/or drive train), braking system 125 (e.g., one or more electromechanically controlled clamping or motion retardation devices disposed along the drivetrain of propulsion system 124, including at or within wheels for platform/passenger vehicle 110), ranging sensor systems 127a (a grille mounted radar system), 127b (a front bumper mounted radar or sonar system), 127c (a pillar mounted radar system), and/or 127d (a rear bumper or trunk mounted radar or sonar system), thermal imaging systems 1240a (a roof mounted "shark fin" or "hat" or radio antenna-integrated thermal imaging system), 1240b (a pillar mounted thermal imaging system), 1240c (a rear windshield mounted thermal imaging system, and/or 1240d (a front windshield mounted thermal imaging system), and/or visible spectrum imaging system 1260a (a front windshield mounted visible spectrum imaging system), 1260b (a roof or roof-rack 1226 mounted visible spectrum imaging system), 1260c (a rear windshield mounted visible spectrum imaging system), and/or 1260d (a trunk mounted visible spectrum imaging system).

More generally, each of the mounting spots identified in FIG. 12 may be used to mount any one or combination of a thermal imaging system, a visible spectrum imaging system, and/or a remote sensor system, as described herein. In various embodiments, all sensor data generated by each of the mounted systems may be used to generate display views rendered by user interface 1232 of platform 110 (e.g., a dash display for passenger vehicle 110).

Figure 13A:
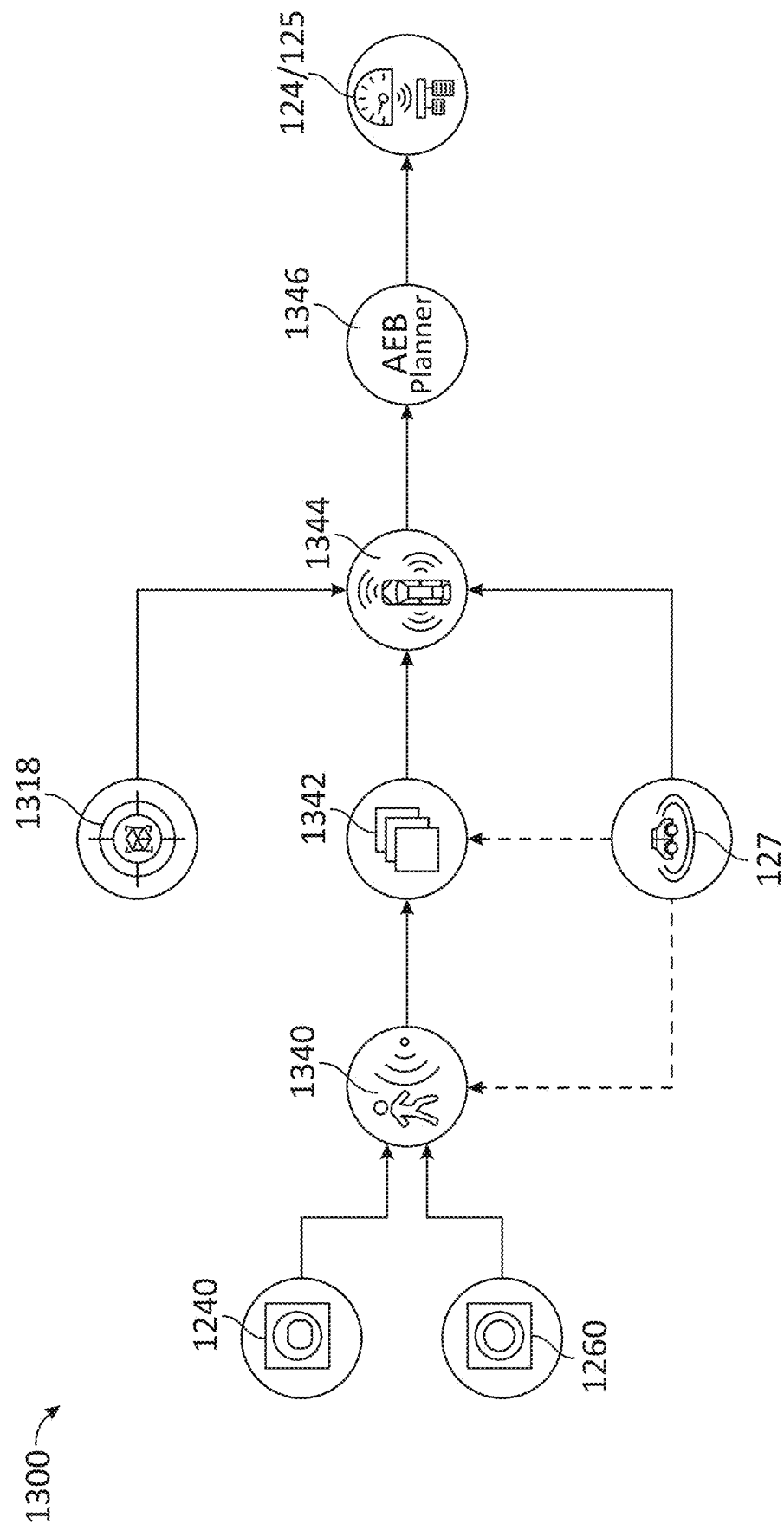
FIG. 13A illustrates a data flow diagram of a mobile platform employing a thermal imaging navigation system in accordance with an embodiment of the disclosure.

FIG. 13A illustrates a data flow diagram 1300 of mobile platform 110 employing thermal imaging navigation system 1200 in accordance with an embodiment of the disclosure. In particular, data flow diagram 1300 shows thermal imaging system 1260 and/or visible spectrum imaging system providing thermal and/or visible spectrum imagery to maneuvering obstacle detector 1340, which may be configured to provide the received imagery and/or associated maneuvering obstacle information (e.g., tagged imagery) generated by maneuvering obstacle detector 1340 to range estimator 1342. Range estimator 1342 may be configured to determine and provide a range estimate associated with each detected maneuvering obstacle represented in the received tagged imagery to sensor data fusor 1344, and sensor data fusor 1344 may be configured to use ranging sensor data provided by ranging sensor system 127 and/or orientation, position, motion, and/or other registration or calibration data provided by registrator 1318 to fuse or otherwise combine the tagged imagery generated by maneuvering obstacle detector 1340 and the associated range estimates, for example, and/or the ranging sensor data provided by ranging sensor system 127, as shown.

Sensor data fusor 1344 may be configured to provide the combined sensor data and/or imagery to braking planner 1346 (e.g., an automatic emergency braking planner), which may be configured to evaluate the combined sensor data and/or imagery, including a projected course of platform 110 (e.g., provided by registrator 1318) and selectively activate braking system 125 and/or other elements of propulsion system 124 to avoid colliding with any of the maneuvering obstacles detected by maneuvering obstacle detector 1340.

In optional embodiments, maneuvering obstacle detector 1340 may be configured to generate tagged imagery based on any one or combination of thermal imagery, visible spectrum imagery, and/or ranging sensor data. Moreover, range estimator 1342 may be configured to determine and provide range estimates associated with each detected maneuvering obstacle based on the tagged imagery provided by maneuvering obstacle detector 1340 and/or ranging sensor data provided by ranging sensor system 127.

In various embodiments, each of maneuvering obstacle detector 1340, range estimator 1342, sensor data fusor 1344, and/or braking planner 1346 may be implemented and/or executed as individual software programs by controller 112. In particular embodiments, maneuvering obstacle detector 1340 may be implemented as one or more CNNs configured to generate tagged thermal, visible, and/or blended imagery, such as through one or more of feature extraction, sematic segmentation, object recognition, classification, and/or other similar CNN based image and/or sensor data processing.

In one embodiment, maneuvering obstacle detector 1340 may be configured to apply a thermal imagery trained CNN to detect maneuvering obstacles represented in the thermal imagery provided by thermal imaging system 1240 and generate corresponding tagged thermal imagery and/or associated map scores (e.g., accuracy likelihood values) for each maneuvering obstacle detected in the thermal imagery. In a related embodiment, maneuvering obstacle detector 1340 may be configured to apply a visible spectrum imagery trained CNN to detect maneuvering obstacles represented in the visible spectrum imagery provided by visible spectrum imaging system 1260 and generate corresponding tagged visible spectrum imagery and/or associated map scores for each maneuvering obstacle detected in the visible spectrum imagery. In such embodiments, maneuvering obstacle detector 1340 may be configured to combine the two sets of tagged images according to a logic function, such as according to one or the other identifying a maneuvering obstacle with a map score above a spectrum-specific threshold value, and/or any commonly detected maneuvering obstacle with a combined map score (from each spectrum) above a combined threshold value.

In another embodiment, maneuvering obstacle detector 1340 may be configured to blend the thermal imagery with the visible spectrum imagery prior to applying a blended imagery trained CNN to detect maneuvering obstacles represented in the blended imagery and generate corresponding tagged blended imagery and/or associated map scores for each maneuvering obstacle detected in the blended imagery, where only maneuvering objects with map scores above a blended imagery threshold value are forwarded as tagged blended imagery to range estimator 1342. In a further embodiment, maneuvering obstacle detector 1340 may be configured to blend the thermal imagery with the visible spectrum imagery and combine the result with ranging sensor data provided by ranging sensor system 127 prior to applying a fused sensor data trained CNN to detect maneuvering obstacles represented in the fused sensor data and generate corresponding tagged blended or spectrum-specific imagery and/or associated map scores for each maneuvering obstacle detected in the fused sensor data, where only maneuvering objects with map scores above a fused sensor data threshold value are forwarded as tagged imagery to range estimator 1342. In various embodiments, any of the CNNs described herein may be trained via synthetic maneuvering obstacles, where computer generated animals and/or other maneuvering obstacles are added to imagery in order to train the CNNs to tag associated imagery appropriately.

Thermal and visible spectrum imagery blending may be performed according to a variety of metrics emphasizing one or more characteristics of one or the other spectrums. In some embodiments, color characteristics of the visible spectrum imagery may be modulated according to overlapping thermal imagery pixel values. In other embodiments, the pixel values of the visible spectrum imagery may be converted to greyscale before being blended with overlapping thermal imagery pixel values. In further embodiments, the thermal imagery pixel values may be mapped to a particular color palette before blended with overlapping visible spectrum imagery pixel values (e.g., greyscale or color pixel values).

In some embodiments, range estimator 1342 may be configured to generate a range and/or relative direction estimate based only on thermal or visible spectrum imagery, such as by identifying common object features with known average feature displacements (e.g., port and starboard tail lights) and determining the range estimate based on the known average feature displacement, the pixel displacement of the identified object features, and one or more displacement calibration parameters (e.g., generally specific to each imaging system). In other embodiments, range estimator 1342 may be configured to generate a range and/or relative direction estimate based on one or any combination of thermal imagery, visible spectrum imagery, or ranging sensor data provided by ranging sensor system 127. For example, if each imaging system is known and fixed relative to ranging sensor system 127, such range estimate may be performed without registration data provided by registrator 1318.

Sensor data fusor 1344 may be configured to fuse substantially synchronous sensor data provided by any of the sensors of systems 100 and/or 1200, for example, and/or may be configured to fuse temporally differentiated data, such as a time series of sensor data and/or tagged images, so as to facilitate accurate maneuvering obstacle tracking, as described herein. Braking planner 1346 may be configured to receive all the individual sensor data, tagged imagery, range and/or relative direction estimates, and/or fused sensor data and selective activate braking system 125 and/or other elements of propulsion system 124 to halt or reduce a speed of platform 110 to avoid potential collision with a maneuvering obstacle detected by maneuvering obstacle detector 1340, as described herein.

Figure 13B:
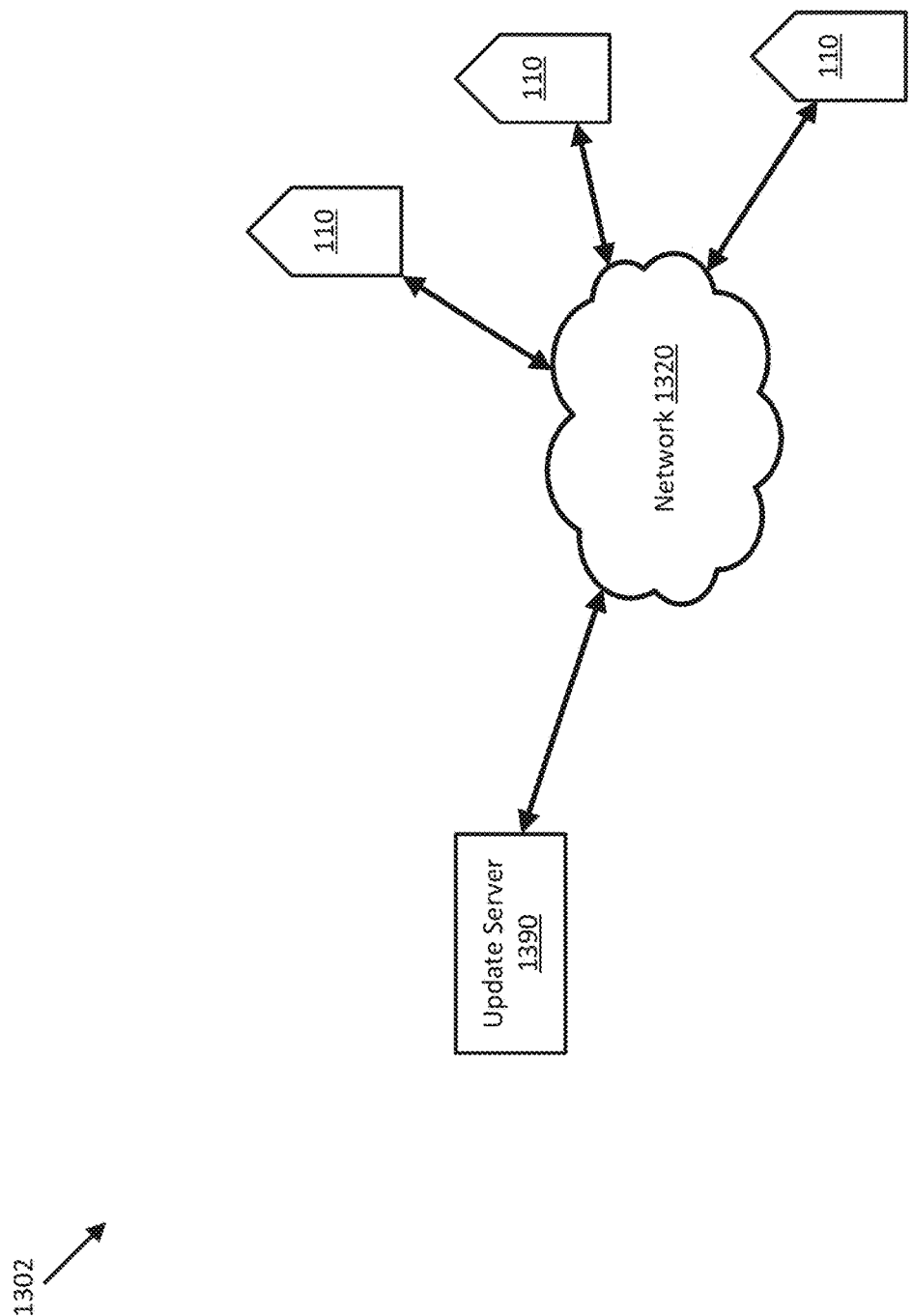
FIG. 13B illustrates a block diagram of an update system for mobile platforms employing thermal imaging navigation systems in accordance with an embodiment of the disclosure.

FIG. 13B illustrates a block diagram of an update system 1302 for mobile platforms 110 employing thermal imaging navigation systems 1200 in accordance with an embodiment of the disclosure. As can be seen in FIG. 13B, update system 1302 may include various platforms 110 each configured to receive CNN configurations (weights) from update server 1390 via network 1320. Each of platforms 110 (e.g., passenger vehicles) may be implemented as described with respect to platform 110 of FIGS. 1 and/or 12. In various embodiments, communication network 1320 may be implemented according to one or more wired and/or wireless network interfaces, protocols, topologies, and/or methodologies, as described herein, and in some embodiments may include one or more LAN and/or WAN networks, including cellular networks and/or the Internet.

In some embodiments, CNN maneuvering obstacle detection failures may be identified (e.g., by user override of thermal imaging navigation system 1200) and/or stored locally at platform 110. In some embodiments, update server 1390 may be configured to receive CNN maneuvering obstacle detection failures and associated sensor data and generate updated CNN configurations to compensate for such edge cases/failures. For example, update server 1390 and/or a connected dedicated CNN trainer and/or an annotation feedback loop may be configured to adjust a current CNN configuration based, at least in part, on the CNN maneuvering obstacle detection failure and may store the updated CNN configuration for distribution to platforms 110.

Update server 1390 may be implemented as a logic device, a tablet computer, laptop, desktop, and/or server computer that may be configured to implement a CNN configuration database that stores and manages CNN configurations associated with different platforms and provide updated CNN configurations to platforms 110 when requested by users, for example, or when pushed by a manufacturer or regulator. Although network 1320 is shown as one element in FIG. 13B, in various embodiments, network 1320 may include multiple network infrastructures and/or combinations of infrastructures where, for example, each platform 110 may be configured to use substantially different network infrastructures to access update server 1390.

Figure 14A:
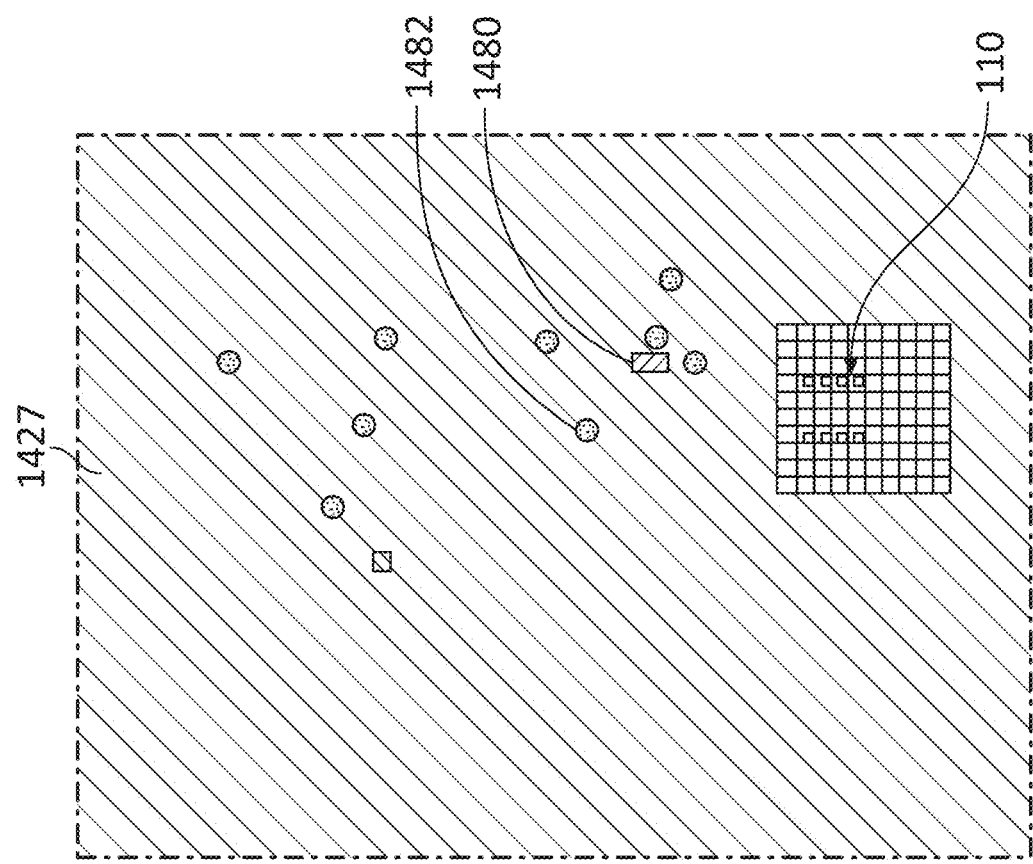
FIGS. 14A-B illustrate display views including imagery generated by a thermal imaging system for a thermal imaging navigation system in accordance with embodiments of the disclosure.
Figure 14A:
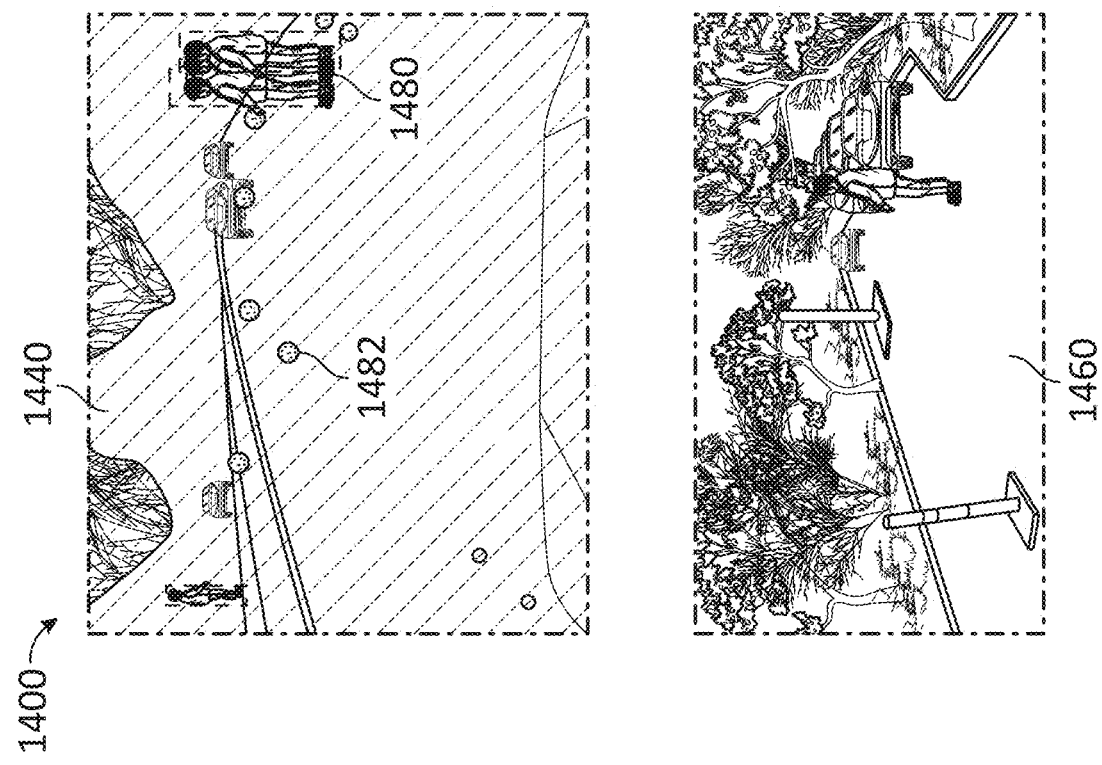
Figure 14B:
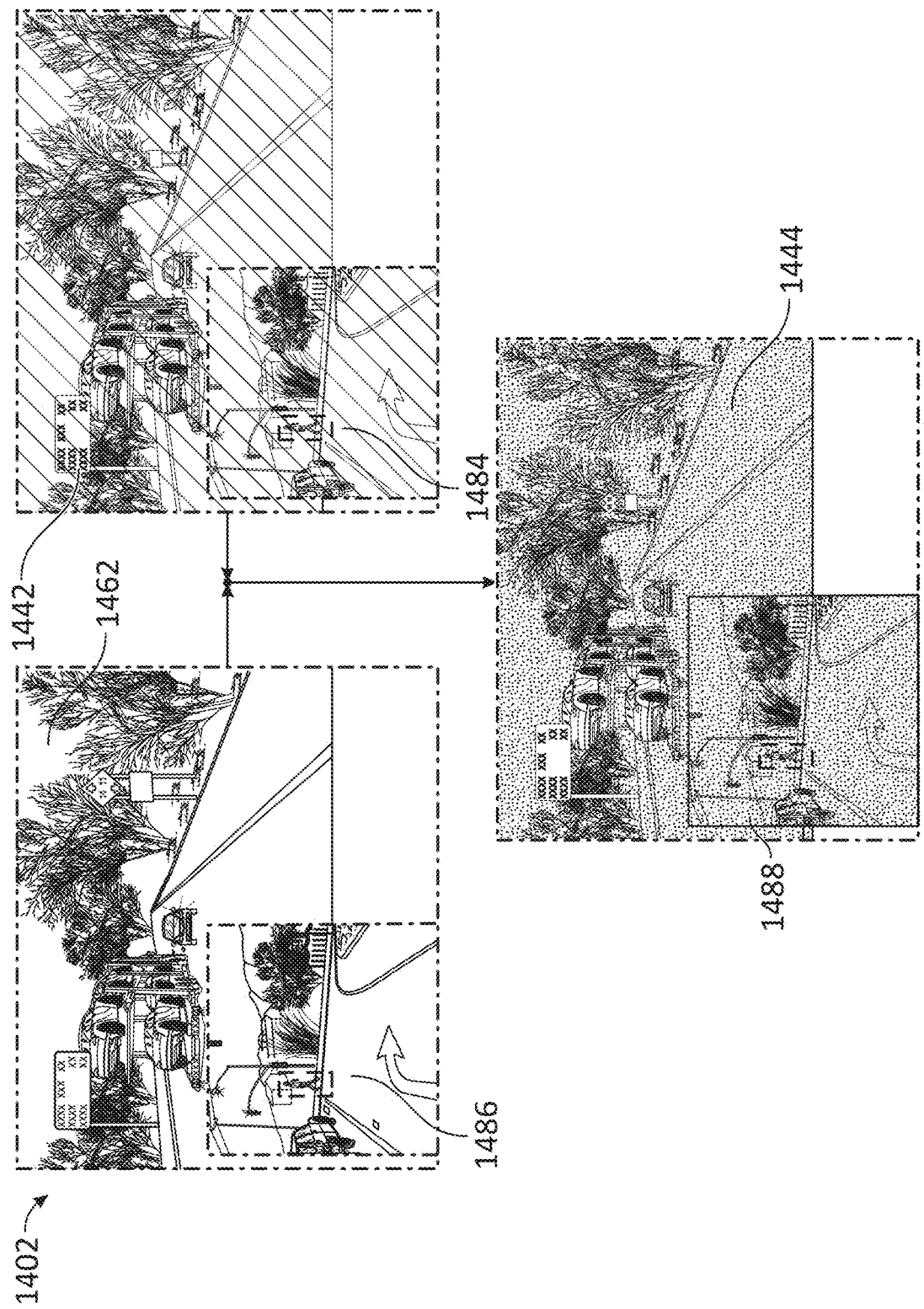

FIGS. 14A-B illustrate display views 1400, 1402 including imagery generated by thermal imaging system 1240 for thermal imaging navigation system 1200 in accordance with embodiments of the disclosure. For example, display view 1400 of FIG. 14A shows visible spectrum image 1460, co-registered thermal image 1440 including image tagging (e.g., CNN based maneuvering obstacle image tags 1480 and radar sensor data tags 1482), and a top-down or birds-eye view of the tagged imagery as fused image 1427, which includes CNN based maneuvering obstacle image tags 1480, radar sensor data tags 1482, and a local area image tag associated with a position of platform 110. Display view 1402 of FIG. 14B shows visible spectrum image 1462 with visible spectrum imagery CNN based maneuvering obstacle tag 1486 (e.g., a person), thermal image 1442 with thermal imagery CNN based maneuvering obstacle tag 1484 (e.g., the same person), and blended image 1444 with blended imagery CNN based maneuvering obstacle tag 1488.

Figure 15:
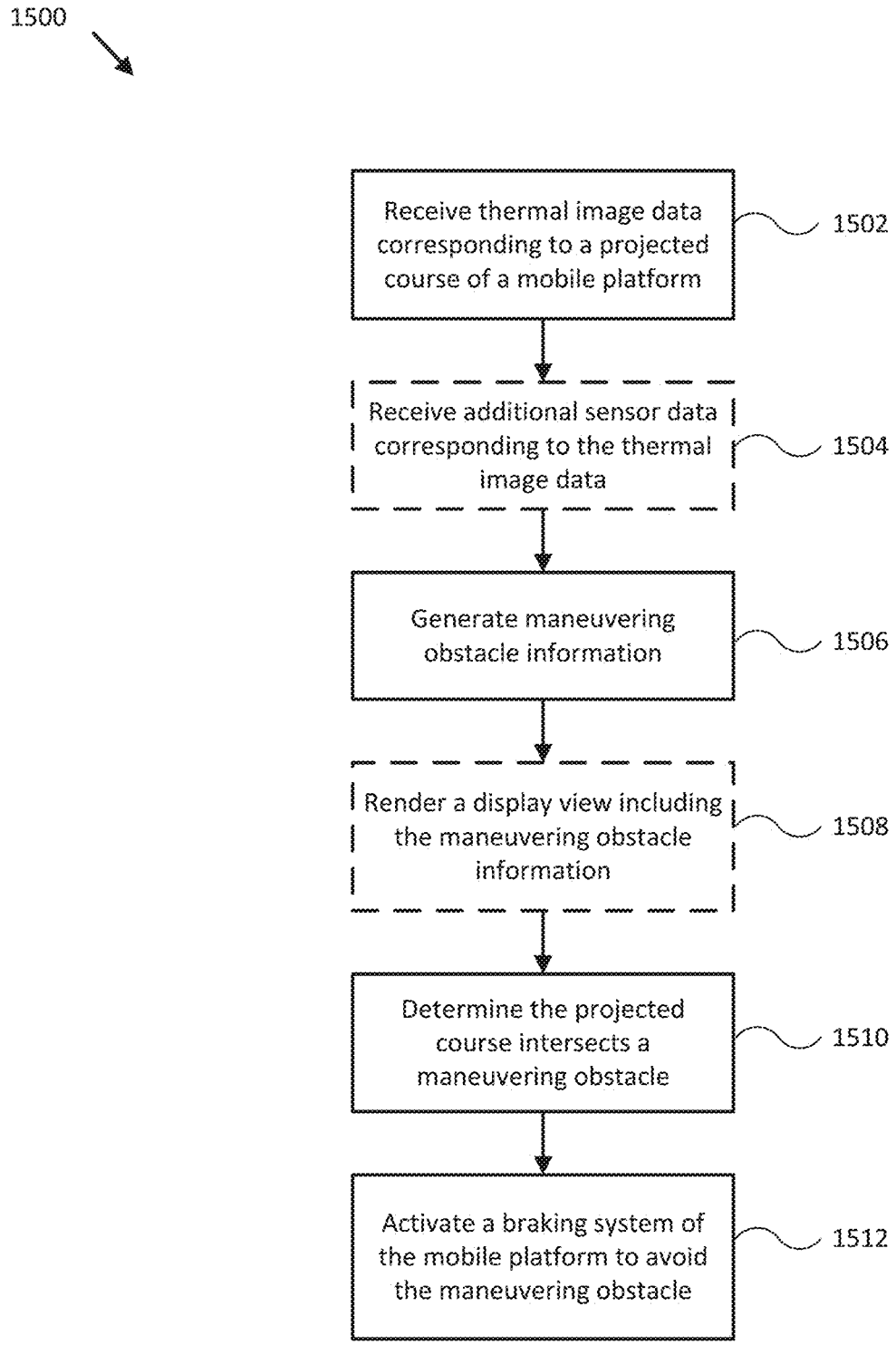
FIG. 15 illustrates a flow diagram of various operations to provide assisted or autopiloted navigation including automated emergency breaking using a thermal imaging navigation system in accordance with embodiments of the disclosure.

FIG. 15 illustrates a flow diagram 1500 of various operations to provide assisted or autopiloted navigation including automated emergency breaking using a thermal imaging navigation system in accordance with embodiments of the disclosure. In some embodiments, the operations of FIG. 15 may be implemented as software instructions executed by one or more logic devices or controllers associated with corresponding electronic devices, sensors, structures, and/or related imagery or display views depicted in FIGS. 1-14B. More generally, the operations of FIG. 15 may be implemented with any combination of software instructions, mechanical elements, and/or electronic hardware (e.g., inductors, capacitors, amplifiers, actuators, or other analog and/or digital components).

Any step, sub-step, sub-process, or block of process 1500 may be performed in an order or arrangement different from the embodiments illustrated by FIG. 15. For example, in other embodiments, one or more blocks may be omitted from or added to each individual process. Furthermore, block inputs, block outputs, various sensor signals, sensor information, calibration parameters, and/or other operational parameters may be stored to one or more memories prior to moving to a following portion of a corresponding process. Although process 1500 is described with reference to systems described in FIGS. 1-14B, process 1500 may be performed by other systems different from those systems and including a different selection of electronic devices, sensors, assemblies, mechanisms, platforms, and/or platform attributes.

Process 1500 of FIG. 15 may generally correspond to a method for navigating a roadway and braking to avoid maneuvering obstacles using a thermal imaging navigation system 1200 (e.g., an embodiment of multispectral navigation system 100 of FIG. 1).

At block 1502, thermal image data corresponding to a projected course for a mobile platform is received. For example, controllers 112, 312, and/or 372, communication modules 120, 144, and/or 134, user interfaces 1232 and/or 132, and/or other elements of systems 100 and/or 1200 may be configured to receive thermal image data from thermal imaging system 1240 and/or imaging module 142 as mobile platform 110 maneuvers along a projected course (e.g., within scene 302).

At block 1504, sensor data corresponding to thermal image data is received. For example, system 1200 may be configured to receive visible spectrum image data, radar data, lidar data, other ranging sensor data, and/or orientation and/or position data (e.g., from various orientation, position, and/or other motion sensors of system 100) corresponding to the thermal image data received in block 1502. In some embodiments, system 1200 may be configured to blend thermal and visible spectrum imagery prior to proceeding to block 1506, for example, or otherwise combining the thermal and visible spectrum imagery with received ranging sensor data prior to proceeding to block 1506, as described herein. In some embodiments, system 1200 may be configured to adjust a framerate of any of the imaging systems of system 1200 based, at least in part, on a speed of platform 110.

At block 1506, maneuvering obstacle information is generated. For example, system 1200 may be configured to generate maneuvering obstacle information (e.g., indicating a position, extent, and/or other characteristics of object 304 in scene 302) corresponding to the projected course of mobile platform 110 (e.g., within scene 302) based, at least in part, on the thermal image data received in block 1502. In other embodiments, system 1200 may be configured to generate maneuvering obstacle information corresponding to the projected course of mobile platform 110 based, at least in part, on a combination of the sensor data and the thermal image data received in blocks 1502 and 1504, as described herein. In various embodiments, such maneuvering obstacle information may include tagged thermal, visible spectrum, and/or blended imagery, as described herein. In some embodiments, such maneuvering obstacle information may include range and/or relative direction estimates, fused sensor data corresponding to detected maneuvering obstacles, and/or other sensor data or processed sensor data, as described herein.

At block 1508, a display view including maneuvering obstacle information is rendered. For example, system 1200 may be configured to render a display view (e.g., display views of FIGS. 13A-14B) including the maneuvering obstacle information generated in block 1506 in a display of user interface 1232 and/or in a display of user interface 132. Such display view may include visible spectrum imagery, thermal spectrum imagery, blended imagery, and/or a fused sensor data, for example, and/or one or more types of image tagging, as described herein.

At block 1510, intersection of a projected course with a maneuvering obstacle area is determined. For example, system 1200 may be configured to determine the projected course for mobile platform 110 intersects a position and/or extent of at least one object 304 in scene 302 based, at least in part, on the maneuvering obstacle information generated in block 1506. For example, each of such determined intersections may be determined by braking planner 1346 and/or controller 112, as described herein.

At block 1512, a braking system of a mobile platform is activated. For example, system 1200 may be configured to activate braking system 125 and/or control other elements of propulsion system 124 of mobile platform 110 to halt or reduce motion of platform 110 to avoid one or more maneuvering obstacles (e.g., multiple objects 304 in scene 302) intersecting the projected course for mobile platform 110, as determined in block 1510. For example, system 1200 may be configured to determine an avoidance course configured to avoid all maneuvering obstacles within scene 302 while braking platform 110 without losing steering control of platform 110 and generally according to a predetermined heading or approach. In other embodiments, system 1200 may be configured to determine a series of avoidance courses configured to avoid individual maneuvering obstacles within scene 302 as mobile platform 110 brakes. More simply, system 1200 may be configured to determine a breaking power to be applied to braking system 125 to halt platform 110 in the least amount of linear travel possible.

By providing such systems and techniques for thermal image-based navigation, embodiments of the present disclosure substantially improve the operational flexibility and reliability of manned and unmanned mobile platforms, including passenger vehicles. Moreover, such systems and techniques may be used to increase the operational safety of users and operators of mobile platforms, including of manned passenger vehicles, beyond that achievable by conventional systems. As such, embodiments provide thermal imaging navigation systems with significantly increased operational convenience and performance.

As described herein, embodiments present an elegant software solution that combines visible spectrum imagery and/or video with thermal imagery and/or video to create a blended combination of the two. In some embodiments, such blended imagery uses partial thermal imagery and also visible spectrum imagery to provide features like color and the ability to read signs and lane markings, even in low light conditions. Examples of such blended imagery are provided herein. Embodiments described herein may be configured to uses such blended imagery as the base imagery for an AI based image processing and object detection and tracking methods. Such methods include providing dewarping and rectification of the two video streams and then runs an object detector (e.g., a CNN based object detector) and tracker on the combined video. The result is a single CNN, which results in better overall efficiency and compute performance. By contrast, existing systems currently process each video stream individually, which doubles the compute requirements on the hardware.

Embodiments described herein provide additional performance over conventional techniques because the CNN and tracker can leverage additional car information (e.g., speed, radar, GPS, direction) as part of the data in the capability of the AI-based processing because the blended video's weighted values of each side can be determined within the AI stack. Additionally, the CNN may use additional information from the scene temperature data provided by a radiometric thermal camera to check average temperatures of classified objects for acceptable range of temperature to help limit false positive detections. For example, pixels of an object classified as a person by the CNN all have temperature values associated with the identified person. Average temperature values may be checked against acceptable ranges for the specific type of target in the associated specific environment.

Night time driving can be difficult for drivers; drivers may find it difficult to see critical road obstructions and/or other objects like Vulnerable Road Users (VRUs) and animals. Embodiments described herein provide additional information to the driver so that the driver can see VRUs and animals with sufficient warning to react so that an accident can be avoided during night and other challenging lighting conditions. For example, blended video with alerts can be presented to the driver, or information from the cameras (e.g., blended, as described herein) and detection mechanism may be used to stop the vehicle using AEB (automatic emergency brakes).

In various embodiments, critical information from the detection of a VRU can be displayed to the driver. For example, example display views (e.g., FIGS. 16A-F) highlight pedestrians and vehicles using the thermal camera, but the visible camera shows the view from the car from the driver's perspective (e.g., including what the driver's eyes can see). When using a CNN with the blended video, embodiments use information combined from thermal and visible spectrum data and reduces computation costs as compared to two separate processing stacks operated independently on the visible spectrum video and the thermal video.

False positive detections are possible with either or both the thermal and visible spectrum imagery. Embodiments described herein use both video channels to more accurately detect VRUs, animals, and other objects (like other vehicles) to more reliably determine the presence and type of object that is classified by the CNN. Embodiments also determine and use additional information corresponding to the average radiometric thermal values of detected objects to determine if a classified object is within expected radiometric thermal values to reduce and/or eliminate false positives in the presence and/or classification of the object.

Certain calibration objects in the scene can also be used as reference temperatures to help ensure the radiometric thermal values of non-calibration objects are valid/calibrated/accurate for other non-calibration objects (like VRUs) that are detected. For example, a calibration object may include a designated portion of a hood for the vehicle the thermal imaging module is attached to—that designated portion of the hood may be in the field of view of the thermal camera, and a temperature sensor may be coupled to the designated portion of the hood and provide an accurate temperature of the designated portion of the hood, which may be used to calibrate the thermal imaging module. Such calibration object may be marked by IR and/or visible spectrum visible markers (e.g., registration spots, crosses, and/or other graphics) to help identify pixels associated with the calibration object. In other embodiments, such calibration objects may be implemented by stationary structures (signs, placards) placed by a road or at an exit of a parking lot or structure that are kept at a standard temperature or are configured to communicate their temperature to system 100, such as through IR or visible spectrum lighted text, for example, or via a wireless beacon.

Various embodiments include a thermal camera (e.g., a thermal imaging module) and a visible spectrum camera (e.g., a visible spectrum imaging module) with similar or at least overlapping fields of view mounted on or otherwise coupled to a vehicle. The two videos may then be scaled, dewarped, and/or rectified via a calibration process employing a registration target that both cameras can see. Such calibration process may be configured to align the pixels between the two camera systems (pixel registration). Visible and thermal lenses/lens systems may have different aspects and the calibration process may compensate for the radial and tangential aspects of each lens so that imagery from the two cameras is substantially aligned and may be superimposed on each other so that imaged objects are overlapping in each video.

In some embodiments, Such registration calibration can be real time adjusted using objects in the scene with detectable and well-defined/sharp edges so that alignment can be maintained or corrected even after initial calibration processes are performed. Aligned imagery may then be displayed to the driver or used by an ADAS enabled vehicle, as described herein. Combined imagery (e.g., display views and/or combined image data) can include variable contributions from 100% thermal and 0% visible to 100% visible and 0% thermal or anywhere in between, for example. Such variation can be selected based on ambient lighting, weather, and/or other environmental conditions where one spectrum provides more reliable image data with respect to a particular application (e.g., object detection, classification, image registration, and/or other image processing, as described herein).

In various embodiments, registered multi-spectral video (thermal and visible) can be displayed to a user and/or input into an object detection algorithm, specifically a CNN based object detector. As described herein, blended video provides superior object detection/perception as compared to only visible or only thermal video. Embodiments of such CNNs may also implement a tracker that maintains a target lock between image frames and increases the reliability of detection of objects through time. Embodiments of such CNNs are relatively highly efficient in compute cost due to employing only one network as compared to conventional image processing for each sensor type. The result is a lower cost due to compute hardware and more reliable detection/classifications due to multiple simultaneous spectrums (e.g., thermal and visible).

Radiometric thermal values (calibrated absolute temperatures) per pixel may also be achieved with thermal imaging modules, as described herein. Such per pixel data may be used when classified objects (e.g., VRU) are detected, and the average values of the pixels associated with the VRU are combined and relative temperature values are obtained. A threshold range may be used to evaluate the object temperatures as compared to expected values for a particular scene/ambient temperature. Such processing adds confidence to the CNNs capability and helps reduce or eliminate false positives, which is particularly helpful for reliable and comfortable AEB applications.

In various embodiments, display views including blended spectral imagery may be generated for drivers. In some embodiments, the blended video may be configured to emphasize street signs and color (from the visible camera), and in other embodiments VRUs in thermal are emphasized. Other display views are primarily visible spectrum imagery with detected objects shown in thermal. In other embodiments, the thermal and visible blended video with CNN detection may be shown to the driver in a configurable manner so that a variety of driver scenarios are accounted for and optimized. For example, in full dark night driving the thermal image module may provide the majority of the video stream. In well lighted situations, the visible spectrum image module may provide the majority of the transparency. In further embodiments, thermal detections will be superimposed on visible spectrum video, especially in conditions where oncoming headlights of cars may glare and wash out visible spectrum imagery.

Figure 16A:
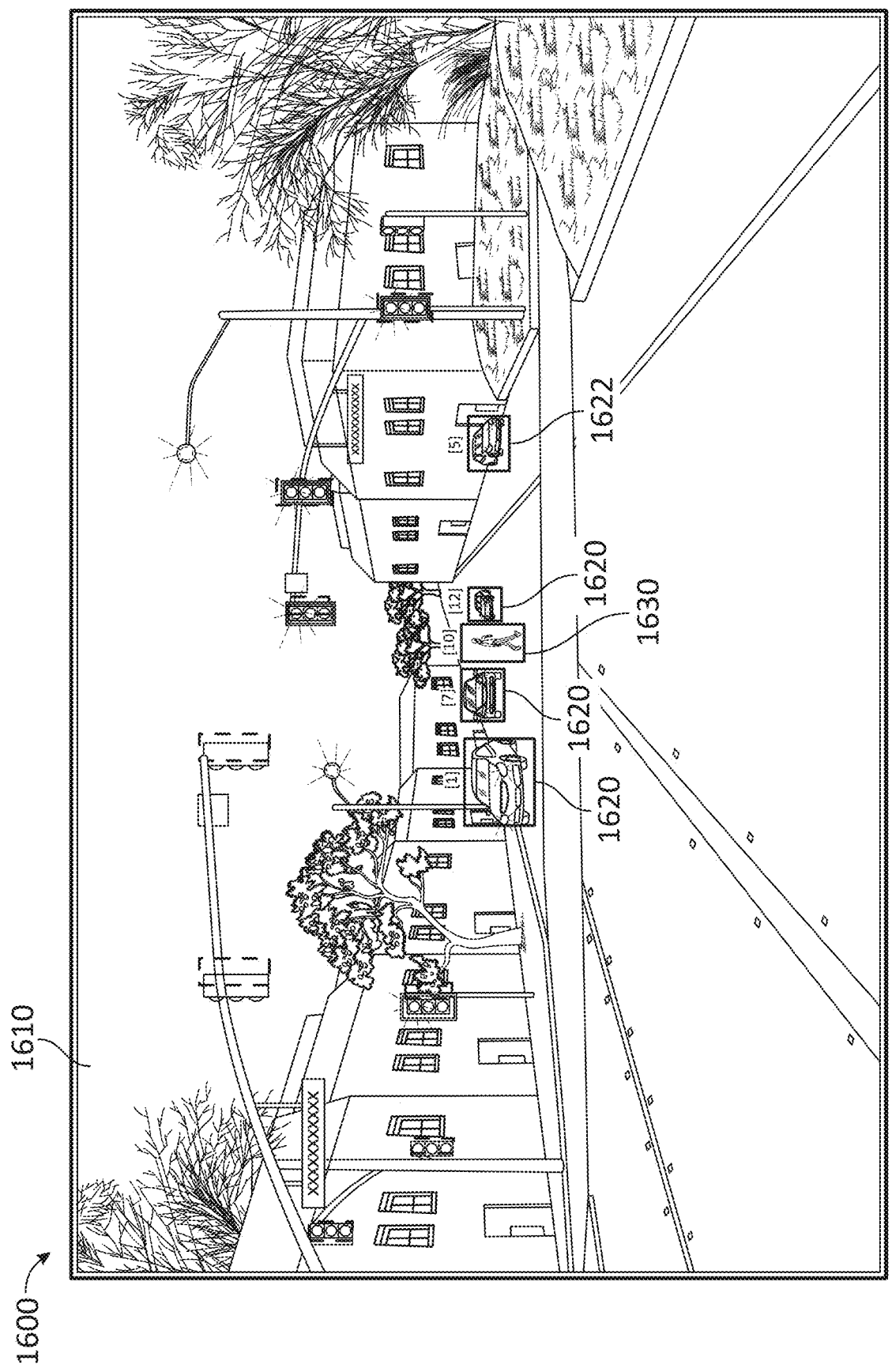
FIGS. 16A-F illustrate display views including imagery generated by a thermal imaging system for a thermal imaging navigation system in accordance with embodiments of the disclosure.
Figure 16B:
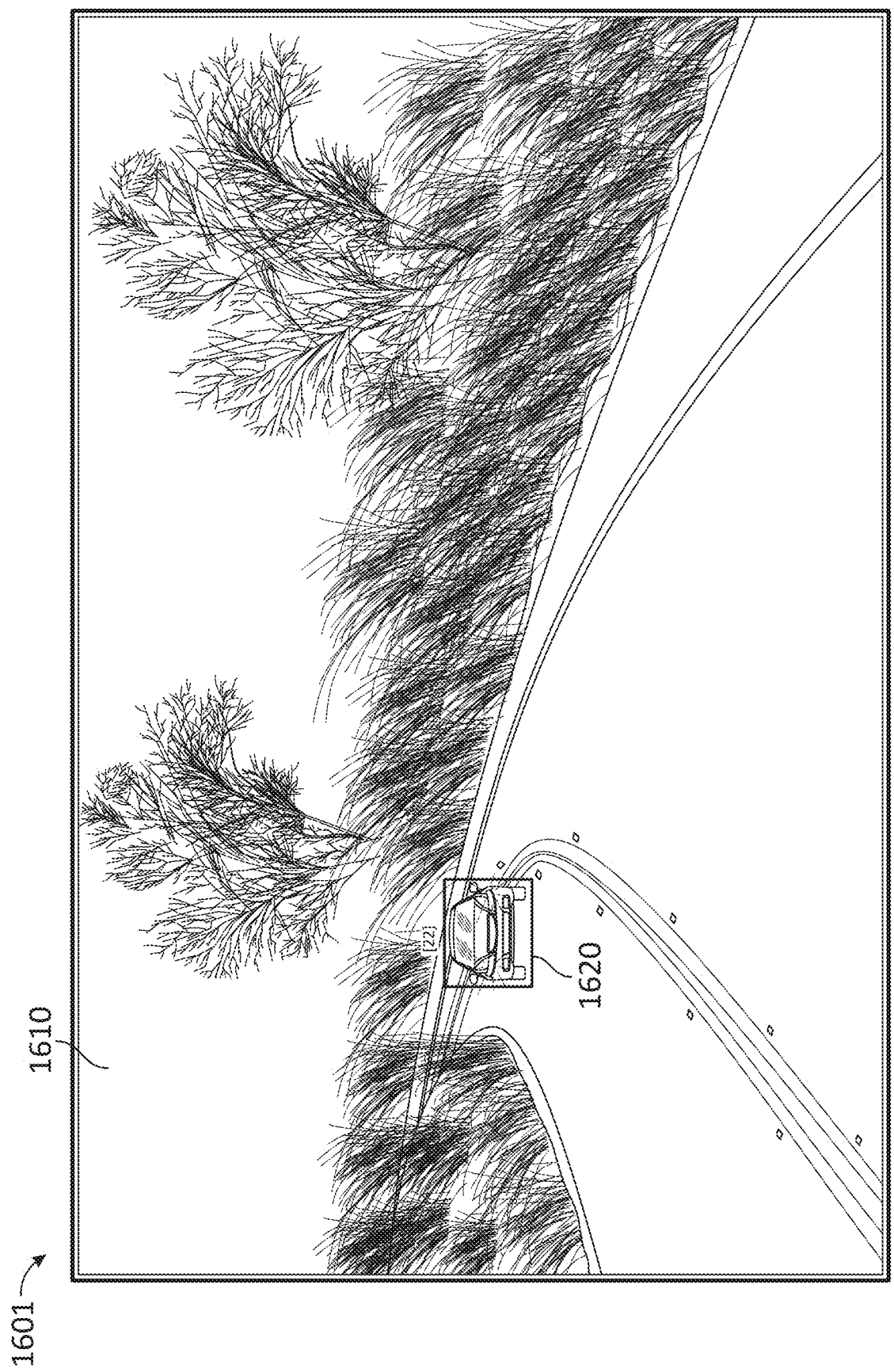

FIGS. 16A-B illustrate display views 1600-1605 including imagery generated by thermal imaging system 1240 for thermal imaging navigation system 1200 in accordance with embodiments of the disclosure. For example, display view 1600 of FIG. 16A shows blended image 1610 with blended imagery CNN based maneuvering obstacle tags 1620 (oncoming traffic), 1622 (parked vehicle along lane), and 1630 (pedestrian walking across traffic in a cross walk). Each maneuvering obstacle tag in display view 1600 includes a labeled box around thermal image data representing the corresponding detected object/maneuvering obstacle. In the embodiment shown in FIG. 16A, blended image 1610 is primarily visible spectrum imagery combined with the thermal imagery associated with maneuvering obstacle tags 1620, 1622, and 1630.

Display view 1601 of FIG. 16B shows blended image 1610 with blended imagery CNN based maneuvering obstacle tag 1620 (oncoming traffic), which is similar to display view 1600 of FIG. 16A, but presents a different environment where the visible spectrum glare of the oncoming headlights would otherwise obscure the oncoming traffic if that portion of blended image 1610 were not overlaid or otherwise blended with the thermal imagery associated with maneuvering obstacle tag 1620.

Figure 16C:
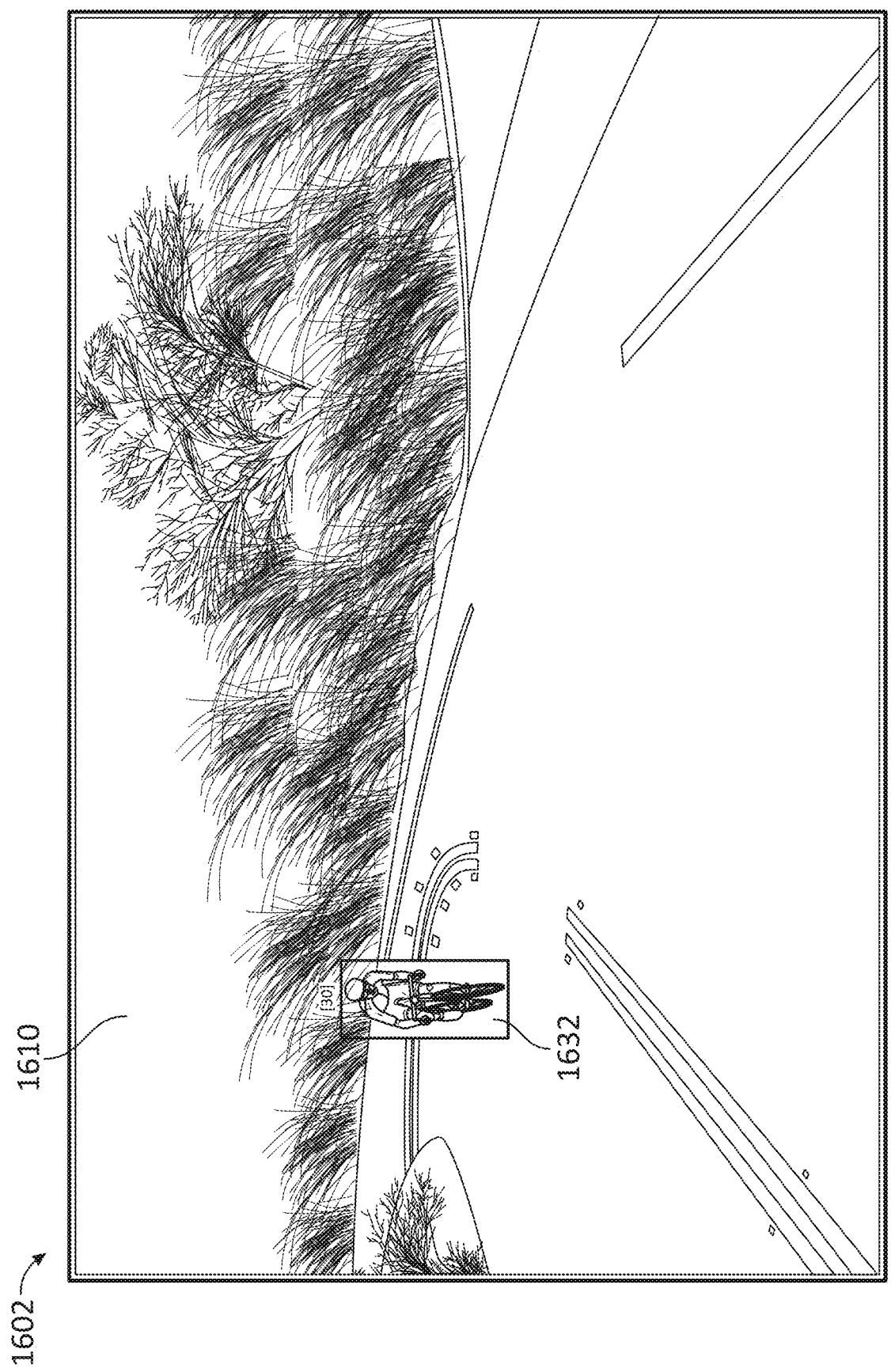

Display view 1602 of FIG. 16C shows blended image 1610 with blended imagery CNN based maneuvering obstacle tag 1632 (oncoming bicycle rider), which is similar to display view 1600 of FIG. 16A, but presents a different environment where the visible spectrum imagery would otherwise not show the oncoming bicycle rider if that portion of blended image 1610 were not overlaid or otherwise blended with the thermal imagery associated with maneuvering obstacle tag 1632.

Figure 16D:
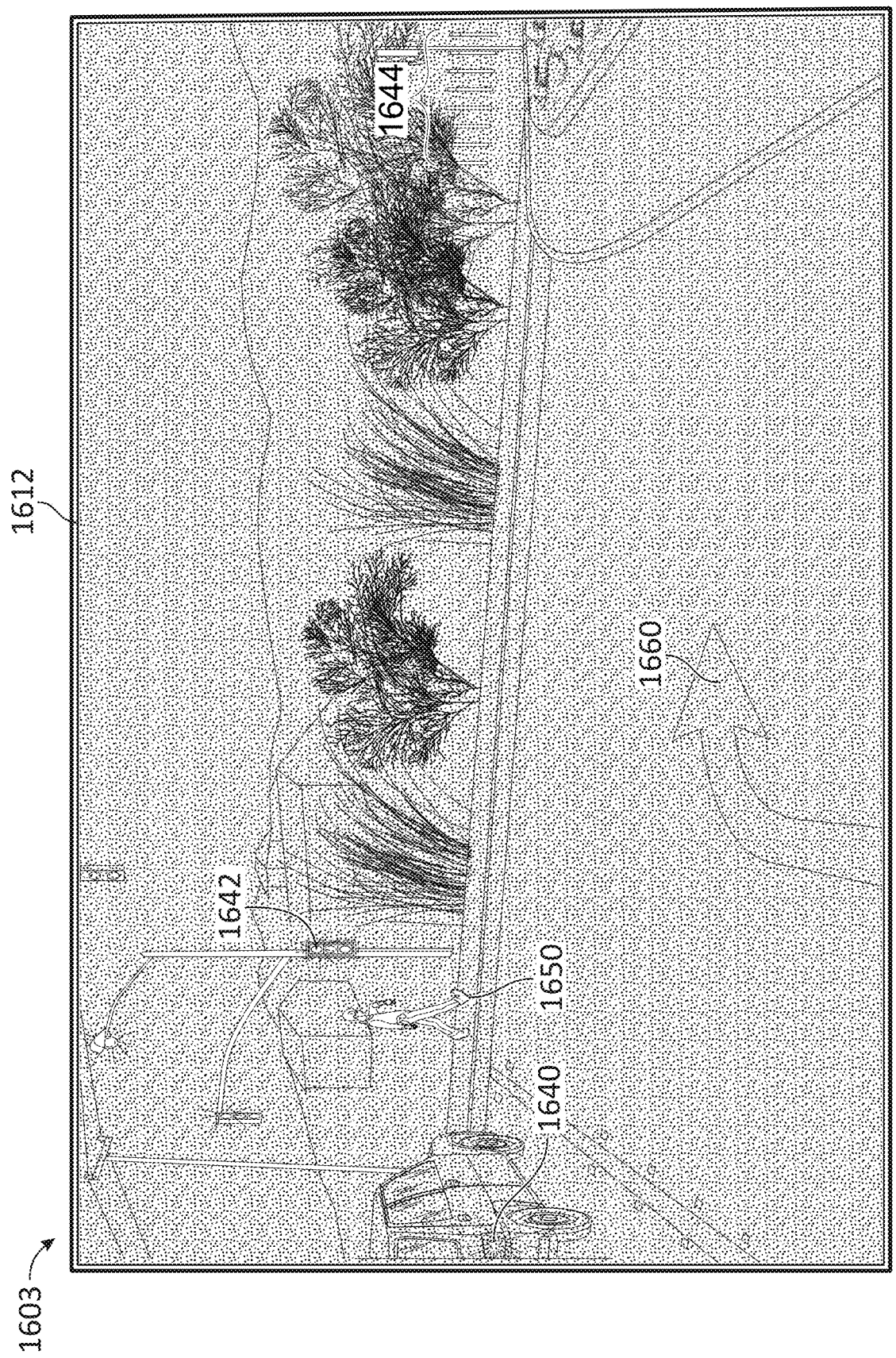

Display view 1603 of FIG. 16D shows blended image 1612 that is primarily thermal imagery combined with visible spectrum imagery associated with various illuminated objects, such as taillight 1640, intersection signal light 1642, and roadside reflectors 1644 (e.g., all shown as red in blended image 1612). In the embodiment shown in FIG. 16D, blended image 1612 includes detail sufficient to identify and detect pedestrian 1650 and lane markings 1660, even in relatively low light conditions (e.g., where visible spectrum imagery might not include similar details).

Figure 16E:
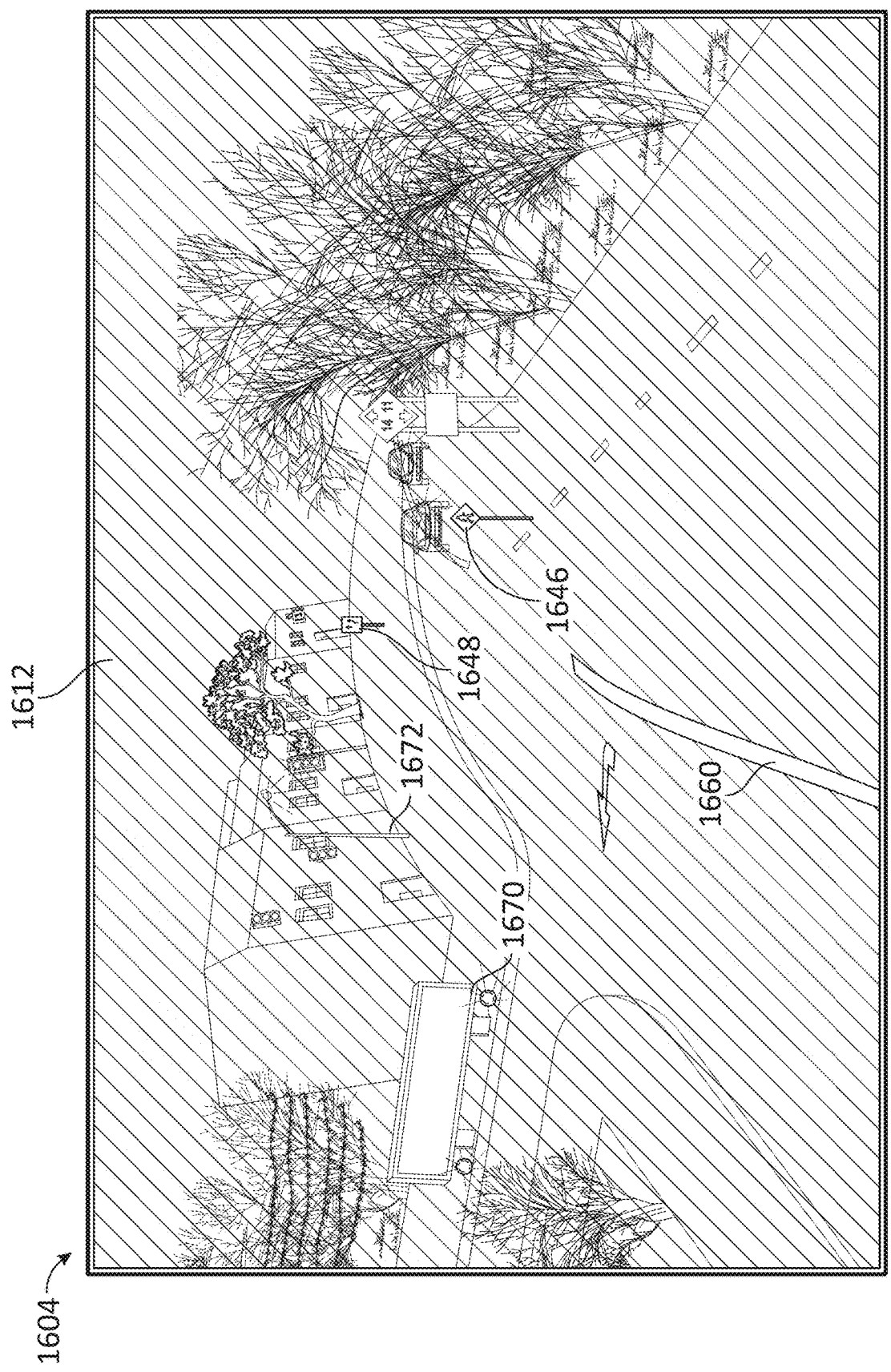

Display view 1604 of FIG. 16E shows blended image 1612 that is primarily thermal imagery combined with visible spectrum imagery associated with various illuminated objects, such as crosswalk sign 1646, lane diversion sign 1648, corner light 1670 (with associated holiday lighting), and streetlight 1672 (e.g., all shown in visible spectrum color—white, yellow, orange—in blended image 1612). In the embodiment shown in FIG. 16E, blended image 1612 includes detail sufficient to identify and detect lane markings 1660, even in relatively low light conditions (e.g., where visible spectrum imagery might not include similar details or otherwise be overblown by glare of oncoming traffic headlights).

Figure 16F:
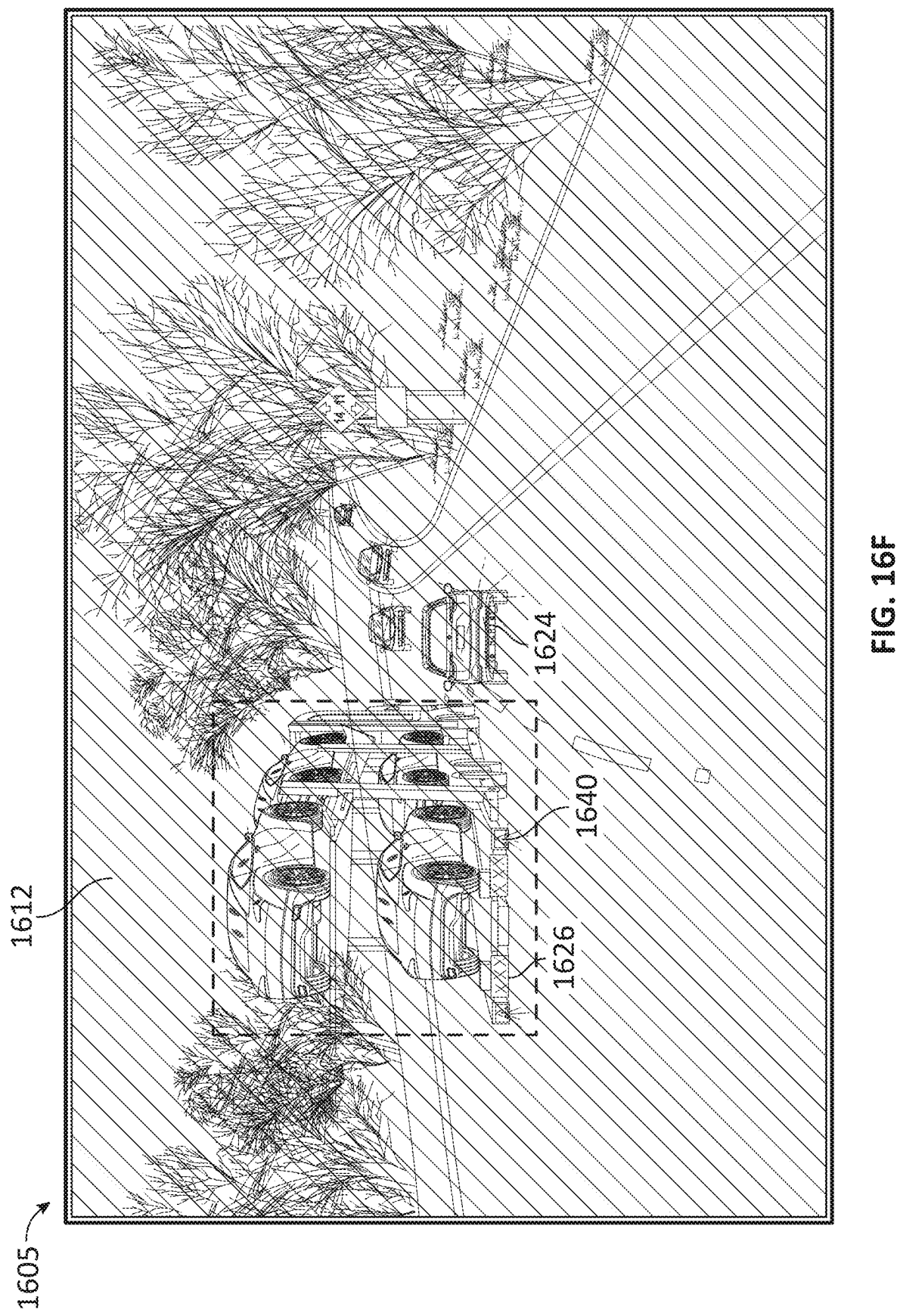

Display view 1605 of FIG. 16F shows blended image 1612 that is primarily thermal imagery combined with visible spectrum imagery associated with various illuminated objects, such as taillights/running lights 1640 (e.g., shown in visible spectrum color—red—in blended image 1612). In the embodiment shown in FIG. 16F, blended image 1612 includes blended imagery CNN based maneuvering obstacle tags 1624 (relatively small sized traffic traveling in the same direction along the road) and 1626 (relatively large sized traffic traveling in the same direction along the lane). Each maneuvering obstacle tag in display view 1600 includes a labeled box around blended image data representing the corresponding detected object/maneuvering obstacle along with its associated illuminated features (e.g., taillights/running lights 1640).

By providing systems and techniques that include CNN based image processing on combined or multispectral imagery, embodiments of the present disclosure substantially improve the operational flexibility and reliability of manned and unmanned mobile platforms, including passenger vehicles. Moreover, such systems and techniques may be used to increase the operational safety of users and operators of mobile platforms, including of manned passenger vehicles, beyond that achievable by conventional systems. As such, embodiments provide thermal imaging navigation systems with significantly increased operational convenience and performance.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

The invention claimed is:

1. A system comprising:
a thermal imaging system, wherein the thermal imaging system comprises a thermal imaging module configured to provide thermal image data corresponding to a projected course for a mobile platform;
a visible spectrum imaging system coupled to the mobile platform and configured to provide visible spectrum image data corresponding to the projected course;
an orientation and/or position sensor coupled to the mobile platform and configured to provide orientation and/or position data associated with motion of the mobile platform;
a ranging sensor system coupled to the mobile platform and configured to provide ranging sensor data corresponding to the projected course; and
a logic device configured to communicate with the thermal imaging system, the visible spectrum imaging system, and the orientation and/or position sensor, wherein the logic device is configured to:
receive the thermal image data corresponding to the projected course;
receive visible spectrum image data corresponding to the thermal image data;
receive orientation and/or position data corresponding to the thermal image data;
receive ranging sensor data corresponding to the thermal image data;
generate blended image data based, at least in part, on the received visible spectrum image data and the received thermal image data;
generate maneuvering obstacle information corresponding to the projected course based, at least in part, on the blended image data, the ranging sensor data, and the orientation and/or position data, wherein the logic device is configured to generate the maneuvering obstacle information at least by applying a fused sensor data trained convolution neural network (CNN) to a combination of the ranging sensor data, the visible spectrum image data, and the thermal image data to obtain the maneuvering obstacle information; and
selectively activate a braking system of the mobile platform based, at least in part, on the generated maneuvering obstacle information corresponding to the projected course.

2. The system of claim 1, wherein the logic device is configured to:
generate the maneuvering obstacle information by associating each detected maneuvering object with a map score and determining a range estimate for each detected maneuvering object associated with a map score above a threshold value.

3. The system of claim 1, wherein the logic device is configured to:
generate the maneuvering obstacle information corresponding to the projected course by applying a blended imagery trained convolution neural network (CNN) to the blended image data to obtain the maneuvering obstacle information.

4. The system of claim 1, wherein the logic device is configured to:
generate the blended image data based on pixel values of the received visible spectrum image data and pixel values of the received thermal image data to obtain the blended image data.

5. The system of claim 4, wherein the logic device is configured to generate the blended image data by modulating pixel values of the received visible spectrum image data based on overlapping pixel values of the received thermal image data to obtain the blended image data.

6. The system of claim 1, wherein:
the ranging sensor system comprises a grille mounted radar system and/or a grille mounted lidar system.

7. The system of claim 1, further comprising a communication module configured to establish a wireless communication link with an update server associated with the mobile platform, wherein:
the thermal imaging system is configured to be coupled to the mobile platform; and
the logic device is configured to receive the thermal image data from the thermal imaging system as the mobile platform maneuvers along the projected course and to report the generated maneuvering obstacle information corresponding to the projected course over the wireless communication link to the update server.

8. The system of claim 1, wherein the logic device is further configured to adjust a frame rate associated with the thermal imaging system and/or the visible spectrum imaging system based on a speed of the mobile platform.

9. A method comprising:
receiving thermal image data from a thermal imaging system comprising a thermal imaging module configured to provide thermal image data corresponding to a projected course for a mobile platform;
receiving orientation and/or position data corresponding to the thermal image data from an orientation and/or position sensor coupled to the mobile platform;
receiving visible spectrum image data corresponding to the thermal image data from a visible spectrum imaging system coupled to the mobile platform and configured to provide visible spectrum image data corresponding to the projected course;
receiving ranging sensor data corresponding to the thermal image data from a ranging sensor system coupled to the mobile platform and configured to provide ranging sensor data corresponding to the projected course;
generating blended image data based, at least in part, on the received visible spectrum image data and the received thermal image data;
generating maneuvering obstacle information corresponding to the projected course based, at least in part, on the ranging sensor data, the blended image data, and the orientation and/or position data, wherein the generating the maneuvering obstacle information comprises applying a fused sensor data trained convolution neural network (CNN) to a combination of the ranging sensor data, the visible spectrum image data, and the thermal image data to obtain the maneuvering obstacle information; and
selectively activating a braking system of the mobile platform based, at least in part, on the generated maneuvering obstacle information corresponding to the projected course.

10. The method of claim 9, wherein the generating the maneuvering obstacle information comprises associating each detected maneuvering object with a map score and determining a range estimate for each detected maneuvering object associated with a map score above a threshold value.

11. The method of claim 9, wherein the generating the maneuvering obstacle information comprises applying blended imagery trained convolution neural network (CNN) to the blended image data to obtain the maneuvering obstacle information.

12. The method of claim 9 wherein the blended image data is based on pixel values of the received visible spectrum image data and pixel values of the received thermal image data.

13. The method of claim 12, wherein the generating the maneuvering obstacle information comprises modulating pixel values of the received visible spectrum image data based on overlapping pixel values of the received thermal image data to obtain the blended image data.

14. The method of claim 9, wherein:
the ranging sensor system comprises a radar system and/or a lidar system.

15. The method of claim 9, further comprising:
receiving the thermal image data from the thermal imaging system as the mobile platform maneuvers along the projected course; and
reporting the generated maneuvering obstacle information corresponding to the projected course over a wireless communication link to an update server associated with the mobile platform via a communication module configured to establish the wireless communication link with the update server.

16. The system of claim 9, further comprising adjusting a frame rate associated with the thermal imaging system and/or the visible spectrum imaging system based on a speed of the mobile platform.

\* \* \* \* \*

UNITED STATES PATENT AND TRADEMARK OFFICE
CERTIFICATE OF CORRECTION

| | | |
|---|---|---|
| PATENT NO. | : 12,443,200 B2 | Page 1 of 1 |
| APPLICATION NO. | : 17/685349 | |
| DATED | : October 14, 2025 | |
| INVENTOR(S) | : Chris J. Posch | |

It is certified that error appears in the above-identified patent and that said Letters Patent is hereby corrected as shown below:

In the Specification

Column 11, Line 66-67, change "U.S. patent application Ser. No." to --U.S. Patent Application No.--

Signed and Sealed this
Eighteenth Day of November, 2025

John A. Squires
*Director of the United States Patent and Trademark Office*